US011975572B2

(12) United States Patent
Yamada et al.

(10) Patent No.: US 11,975,572 B2
(45) Date of Patent: May 7, 2024

(54) IN-TIRE ELECTRIC DEVICE

(71) Applicant: PACIFIC INDUSTRIAL CO., LTD., Ogaki (JP)

(72) Inventors: Hirohisa Yamada, Yamagata (JP); Hiroki Isowa, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 415 days.

(21) Appl. No.: 17/427,804

(22) PCT Filed: Feb. 28, 2020

(86) PCT No.: PCT/JP2020/008337
§ 371 (c)(1),
(2) Date: Aug. 2, 2021

(87) PCT Pub. No.: WO2021/171561
PCT Pub. Date: Sep. 3, 2021

(65) Prior Publication Data
US 2022/0314716 A1    Oct. 6, 2022

(51) Int. Cl.
*B60C 23/04* (2006.01)
*G01L 17/00* (2006.01)
*G01L 19/08* (2006.01)

(52) U.S. Cl.
CPC ........ *B60C 23/04985* (2020.05); *G01L 17/00* (2013.01); *G01L 19/086* (2013.01)

(58) Field of Classification Search
None
See application file for complete search history.

(56) References Cited

U.S. PATENT DOCUMENTS

| 7,377,156 B1 * | 5/2008 | Mattson | ............ B60C 23/04985 |
|---|---|---|---|
| | | | 73/146 |
| 2006/0059982 A1 | 3/2006 | Shimura | |

(Continued)

FOREIGN PATENT DOCUMENTS

| CN | 1753797 A | 3/2006 |
|---|---|---|
| CN | 1761584 A | 4/2006 |

(Continued)

OTHER PUBLICATIONS

Jun. 2, 2020 Search Report issued in International Patent Application No. PCT/JP2020/008337.

(Continued)

*Primary Examiner* — Peter J Macchiarolo
*Assistant Examiner* — Jermaine L Jenkins
(74) *Attorney, Agent, or Firm* — Oliff PLC

(57) ABSTRACT

An in-tire electric device having a bracket and an electric circuit unit detachably held by the bracket includes: an engagement protrusion and an engagement hole provided on the electric circuit unit and the bracket to engage with each other to restrict, through a two-step operation where the electric circuit unit is moved in a first direction and then moved or rotated in a second direction intersecting the first direction, all movements and rotations except for a reverse of the second direction; a retainer mounted on the bracket from a direction intersecting the second direction and facing the electric circuit unit in the second direction to restrict the electric circuit unit from moving in the second direction; and retainer locking portions formed on the bracket and the retainer and engage with each other by elastic deformation of one of the retainer locking portions to lock the retainer to the bracket.

10 Claims, 19 Drawing Sheets

(56) References Cited

U.S. PATENT DOCUMENTS

| | | |
|---|---|---|
| 2006/0144133 A1 | 7/2006 | Shimura |
| 2006/0220812 A1* | 10/2006 | Luce .................. B60C 23/0408 |
| | | 73/146 |
| 2006/0248947 A1 | 11/2006 | Phalak et al. |
| 2007/0257666 A1 | 11/2007 | Laure et al. |
| 2009/0218459 A1 | 9/2009 | Durif et al. |
| 2010/0238011 A1* | 9/2010 | Carr .................... B60C 23/0408 |
| | | 340/442 |
| 2011/0296907 A1 | 12/2011 | Luce |
| 2012/0204635 A1 | 8/2012 | Kutzscher |
| 2013/0133800 A1 | 5/2013 | Griffoin |
| 2013/0174955 A1 | 7/2013 | Yasunaga et al. |
| 2014/0007666 A1 | 1/2014 | Kutzscher et al. |
| 2017/0349010 A1 | 12/2017 | Wilson et al. |
| 2018/0056736 A1 | 3/2018 | Yu et al. |
| 2019/0225032 A1 | 7/2019 | Inck et al. |
| 2020/0055353 A1 | 2/2020 | Nishii |
| 2022/0176754 A1* | 6/2022 | Isowa ............... B60C 23/04985 |

FOREIGN PATENT DOCUMENTS

| | | |
|---|---|---|
| CN | 201069379 Y | 6/2008 |
| CN | 103129330 A | 6/2013 |
| CN | 103253090 A | 8/2013 |
| CN | 106606010 A | 5/2017 |
| CN | 110418723 A | 11/2019 |
| DE | 102017221890 A1 | 6/2019 |
| EP | 3287303 A1 | 2/2018 |
| JP | 2003-200723 A | 7/2003 |
| JP | 2007-118885 A | 5/2007 |
| JP | 2007-196702 A | 8/2007 |
| JP | 2012-232640 A | 11/2012 |
| JP | 2012-245888 A | 12/2012 |
| JP | 2018-506462 A | 3/2018 |
| KR | 1020090102454 A | 9/2009 |
| TW | 200306258 A | 11/2003 |

OTHER PUBLICATIONS

Jun. 2, 2020 Written Opinion of the International Searching Authority issued in International Patent Application No. PCT/JP2020/008337.

May 26, 2023 Office Action Issued In U.S. Appl. No. 17/437,625.

Sep. 13, 2023 U.S. Notice of Allowance issued U.S. Appl. No. 17/437,625.

Jun. 2, 2020 Search Report issued in International Patent Application No. PCT/JP2020/008348.

Jun. 2, 2020 Written Opinion of the International Searching Authority issued in International Patent Application No. PCT/JP2020/008348.

Nov. 4, 2021 Search Report issued in European Patent Application No. 20916233.8.

Nov. 16, 2021 Office Action issued in European Patent Application No. 20916233.8.

Nov. 3, 2021 Search Report issued in European Patent Application No. 20920765.3.

Nov. 19, 2021 Office Action issued in European Patent Application No. 20920765.3.

U.S. Appl. No. 17/437,625, filed Sep. 9, 2021 in the name of ISOWA et al.

Nov. 1, 2022 Office Action issued in Chinese Patent Application No. 202080012383.8.

Oct. 10, 2022 Office Action Issued in Chinese Patent Application No. 202080018755.8.

* cited by examiner

IN-TIRE ELECTRIC DEVICE

TECHNICAL FIELD

The present disclosure relates to an in-tire electric device including a bracket fixed to a tire wheel and an electric circuit unit detachably held by the bracket.

BACKGROUND ART

As an in-tire electric device of this type, an in-tire electric device is known in which a bracket is fixed to a tire wheel by a belt wound around a rim of the tire wheel, and an electric circuit unit elastically deforms and engages an engaging portion provided on the bracket.

CITATIONS LIST

Patent Literature

Patent Literature 1: US 2014/0007666 A, FIG. 3, paragraph [0029]

SUMMARY OF INVENTION

Technical Problems

However, the above-mentioned conventional in-tire electric device has had a problem in that increasing a force with which the electric circuit unit is held by the bracket increases resilient force of the engaging portion when attaching the electric circuit unit to the bracket, and makes it difficult to attach the bracket to the electric circuit unit. The present disclosure therefore provides an in-tire electric device in which an electric circuit unit can be easily attached to a bracket and a force with which the electric circuit unit is held by the bracket has been increased than before.

Solutions to Problems

An in-tire electric device according to one aspect of the invention made to solve the above-mentioned problem includes a bracket fixed to an outer peripheral surface of a rim of a tire wheel by a belt wound around the outer peripheral surface of the rim and an electric circuit unit detachably held by the bracket, the in-tire electric device including: an engagement protrusion and an engagement hole that are provided on the electric circuit unit and the bracket and engage with each other in such a way as to restrict, through a two-step operation in which the electric circuit unit is moved in a first direction with respect to the bracket and then moved or rotated in a second direction intersecting the first direction, all movements and rotations except for a reverse of the second direction; a retainer that is mounted on the bracket from a direction intersecting the second direction and faces the electric circuit unit in the second direction to restrict the electric circuit unit from moving in the second direction; and retainer locking portions that are formed on the bracket and the retainer and engage with each other by elastic deformation of one of the retainer locking portions to lock the retainer to the bracket.

DESCRIPTION OF EMBODIMENTS

First Embodiment

Figure 1:
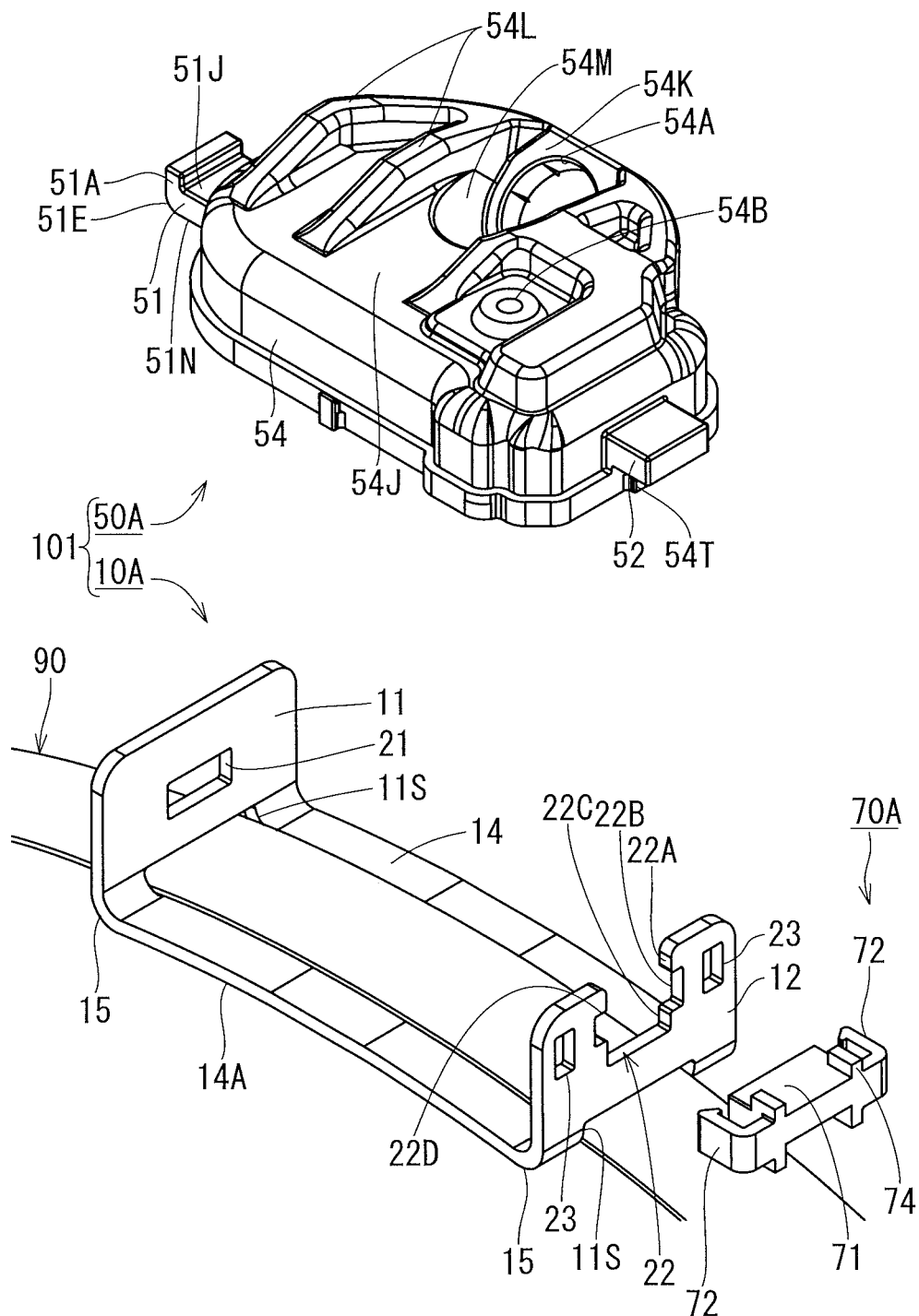
FIG. 1 is a perspective view of an in-tire electric device in a disassembled state according to a first embodiment of the present disclosure.

An in-tire electric device 101 of a first embodiment of the present disclosure will be described below with reference to FIGS. 1 to 7. As illustrated in FIG. 1, the in-tire electric device 101 of the present embodiment includes an electric circuit unit 50A and a bracket 10A for supporting the electric circuit unit 50A. Furthermore, a retainer 70A is detachably provided on the bracket 10A. The bracket 10A is constituted by the retainer 70A and a main body of the bracket 10A to/from which the retainer 70A is attached/detached. In the following description, the main body of the bracket 10A to/from which the retainer 70A is attached/detached is simply referred to as the "bracket 10A". Furthermore, the vertical direction in FIG. 1 is referred to as the "vertical direction" in the in-tire electric device 101.

Figure 2:
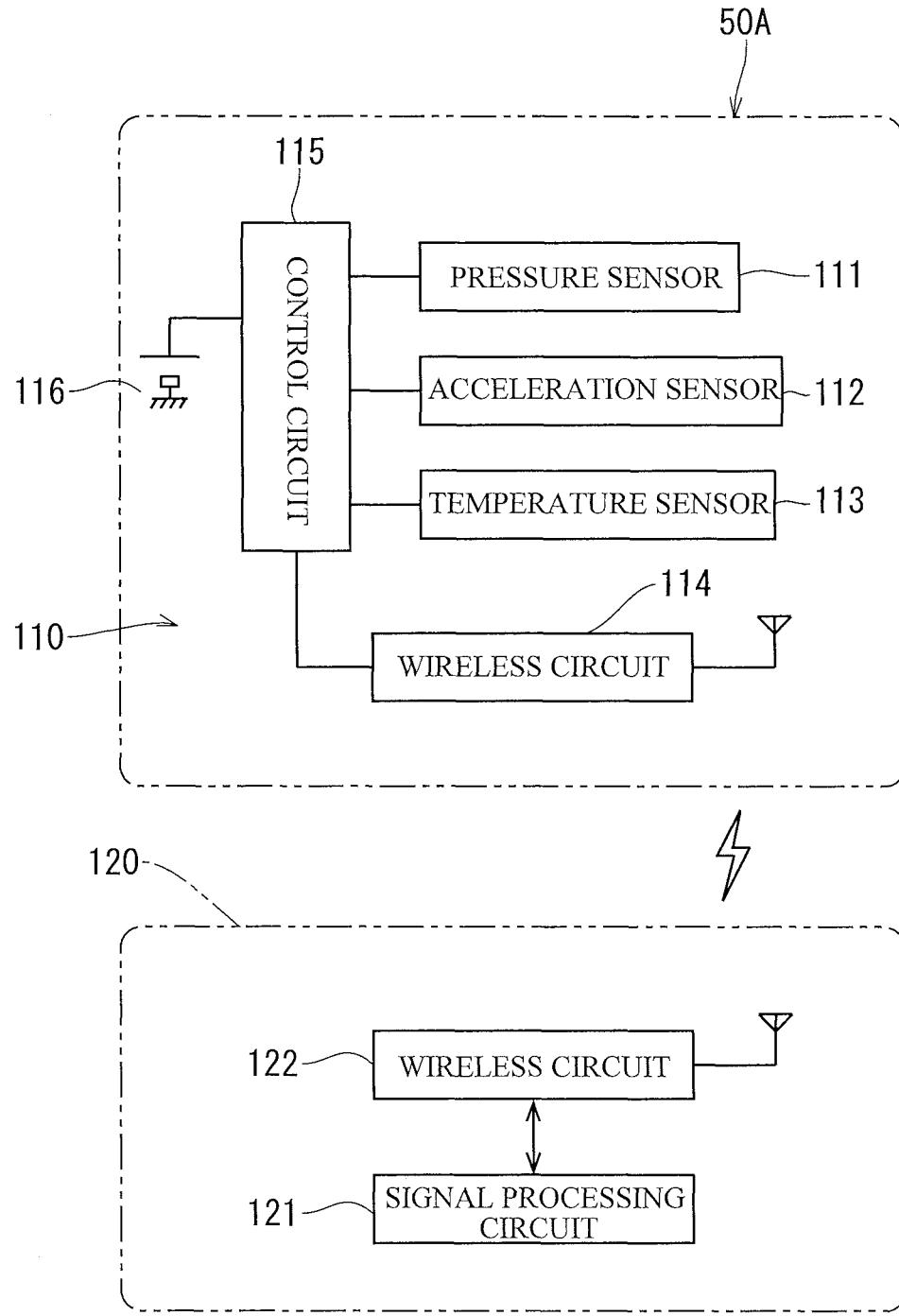
FIG. 2 is a circuit diagram of an electric circuit in an electric circuit unit.
Figure 3:
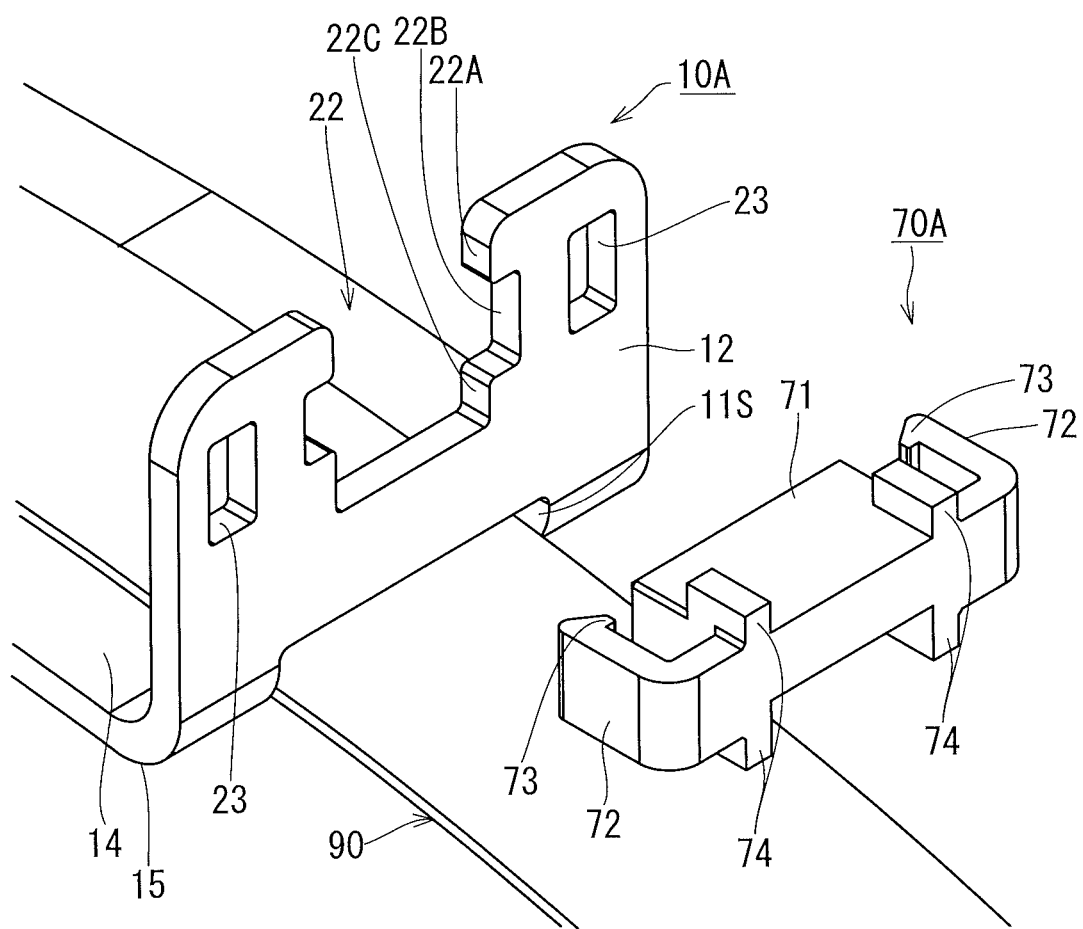
FIG. 3 is a partially enlarged perspective view of a bracket.

The electric circuit unit 50A contains an electric circuit 110 illustrated in FIG. 2 therein. The electric circuit 110 is a known electric circuit arranged in a tire 99, and includes a pressure sensor 111, an acceleration sensor 112, a temperature sensor 113, a wireless circuit 114, and a power supply 116 (for example, a button battery) that are connected to a control circuit 115.

Furthermore, a vehicle body 120 is provided with a signal processing circuit 121 corresponding to the electric circuit unit 50A. Wireless communication is performed between a wireless circuit 122 connected to the signal processing circuit 121 and the wireless circuit 114 of the electric circuit unit 50A so that detection results of the pressure sensor 111, the acceleration sensor 112, and the temperature sensor 113 are taken into the signal processing circuit 121. Then, the signal processing circuit 121 monitors the state of the tire 99 on the basis of the detection results of the pressure sensor 111 and the temperature sensor 113, and monitors the condition of a road surface on the basis of the detection result of the acceleration sensor 112, for example.

The electric circuit 110 in the electric circuit unit 50A is not limited to the above-mentioned configuration as long as the electric circuit 110 is arranged and used in the tire 99. For example, the electric circuit 110 may include only any one or two of the pressure sensor 111, the acceleration sensor 112, and the temperature sensor 113, or may include a sensor other than those. Furthermore, the detection result of the acceleration sensor 112 may be used, for example, to determine whether the vehicle is moving or not.

The electric circuit unit 50A houses the above-mentioned electric circuit 110 in a housing 54 illustrated in FIG. 1. The housing 54 has a box-shaped structure having a substantially rectangular planar shape. A plurality of ribs 54L extending in the lateral direction protrudes from a plurality of positions in the longitudinal direction on a substantially rectangular upper surface 54J of the housing 54. Furthermore, a protruding wall 54K juts obliquely upward from an outer edge on one long side of the upper surface 54J of the housing 54, and one end of the plurality of ribs 54L is connected to the protruding wall 54K. Furthermore, a ventilation hole 54B communicating with the pressure sensor 111 in the housing 54 is opened between the ribs 54L on the upper surface 54J of the housing 54. Moreover, a valve mounting hole 54A is formed in the protruding wall 54K, and an arc groove 54M concentric with the valve mounting hole 54A is formed at a position close to the protruding wall 54K on the upper surface of the housing 54. Then, for example, by inserting and fixing an end of a tire valve (not illustrated) into the valve mounting hole 54A, it is possible to fix the electric circuit unit 50A to a tire wheel 95 (see FIG. 5) without using the bracket 10A.

A first engagement protrusion 51 and a second engagement protrusion 52 protrude in opposite directions from both end surfaces of the housing 54 in the longitudinal direction. The first engagement protrusion 51 forms a rectangular cross section being flat in the vertical direction and extends in a direction perpendicular to the vertical direction. Furthermore, a locking ridge 51A protrudes from an edge on the tip side of an upper surface 51J of the first engagement protrusion 51, and a corner between a lower surface 51N of the first engagement protrusion 51 and a tip surface is round-chamfered and has an arc surface 51E.

On the other hand, the second engagement protrusion 52 has a shape obtained by removing the locking ridge 51A and the arc surface 51E from the first engagement protrusion 51, and extends coaxially with the first engagement protrusion 51. Furthermore, on the both end surfaces of the housing 54 in the longitudinal direction, rectangular protrusions 54T protrude one from a position directly below the first engagement protrusion 51 and one from a position directly below the second engagement protrusion 52 (only the rectangular protrusion 54T below the second engagement protrusion 52 is illustrated in FIG. 1). The amount of protrusion of each of the rectangular protrusions 54T is smaller than that of the first engagement protrusion 51 or the second engagement protrusion 52, and each of the rectangular protrusions 54T has a tip surface that is a flat surface perpendicular to the protruding direction of the first engagement protrusion 51 or the second engagement protrusion 52.

The bracket 10A has a structure in which both ends of a strip-shaped sheet metal are bent with respect to an intermediate portion between the both ends so as to face each other. Then, the intermediate portion of the strip-shaped sheet metal constitutes a base portion 14, and the both ends constitute a first facing support portion 11 and a second facing support portion 12 that are erected upward from the base portion 14.

Figure 5:
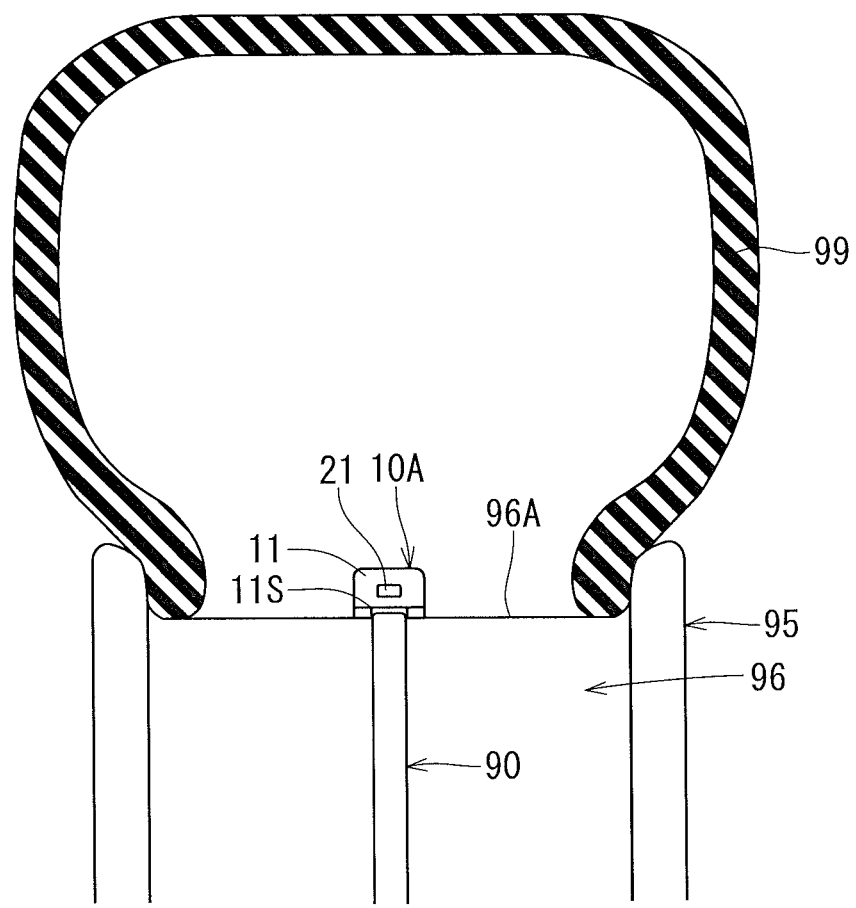
FIG. 5 is a sectional view of a tire with the bracket arranged inside.

The base portion 14 is curved so as to bulge upward in an arc shape. Furthermore, the first facing support portion 11 and the second facing support portion 12 are parallel to each other and face each other. Moreover, at a base end portion of each of the first facing support portion 11 and the second facing support portion 12, a slit 11S is formed in a central portion in the width direction thereof. Specifically, the slit 11S is formed in a state in which, in the entire portion except for both ends of each of the first facing support portion 11 and the second facing support portion 12 in the width direction, the entire arc surface at an inner corner between the base portion 14 and each of the first facing support portion 11 and the second facing support portion 12 has been removed. Then, as illustrated in FIG. 5, a belt 90 that has been passed through the slits 11S is wound around a portion that is in an outer peripheral surface 96A of a rim 96 in the tire wheel 95 and located inside the tire 99 (for example, a central portion in the width direction of the outer peripheral surface 96A of the rim 96), and the base portion 14 is pressed against and fixed to the outer peripheral surface 96A of the rim 96. The belt 90 is made from metal, for example, and can be tightened by operating a screwing operation portion included in a buckle (not illustrated).

Figure 6:
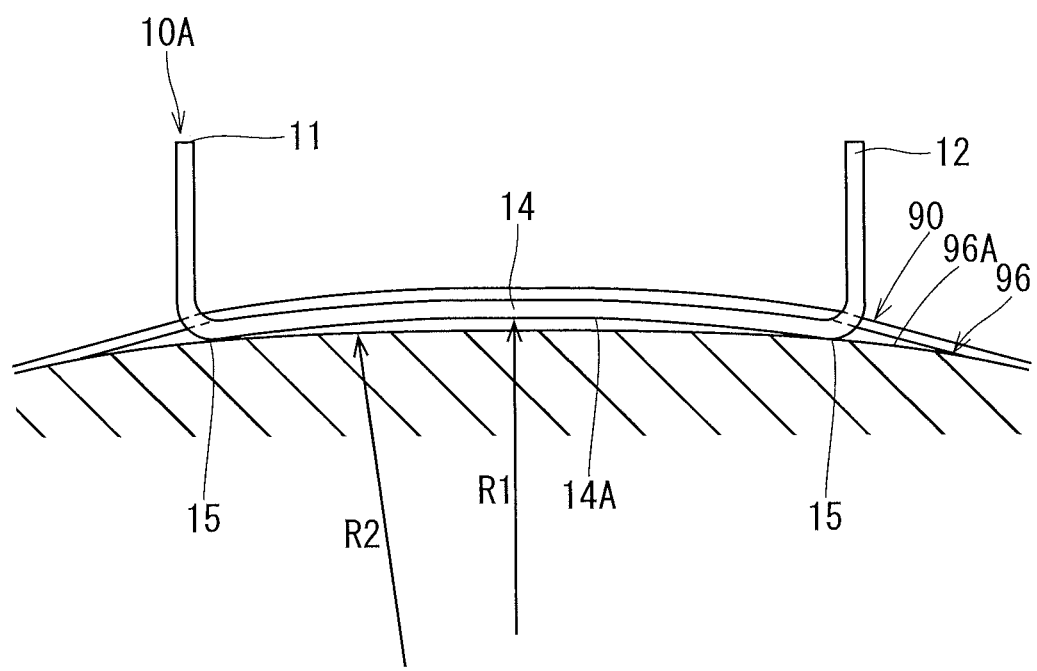
FIG. 6 is a side view of the bracket fixed to an outer peripheral surface of a rim.

As illustrated in FIG. 6, a radius of curvature R1 of a rim facing surface 14A of the base portion 14 facing the outer peripheral surface 96A of the rim 96 is smaller than a radius of curvature R2 of the portion around which the belt 90 is wound in the outer peripheral surface 96A of the rim 96 (hereinafter, this is simply referred to as the "radius of curvature R2 of the outer peripheral surface 96A of the rim 96"). Specifically, the bracket 10A is mainly fixed to the tire wheel 95 of a large vehicle such as a truck or a bus, and the radius of curvature R2 of the outer peripheral surface 96A of the rim 96 of the tire wheel 95 as described above is, for example, 159 [mm] or more. Meanwhile, the radius of curvature R1 of the rim facing surface 14A in the bracket 10A is, for example, less than 159 [mm]. Note that the radius of curvature R2 of the outer peripheral surface 96A of the rim 96 to which the bracket 10A is attached is not limited to 159 [mm] or more, and the radius of curvature R1 of the rim facing surface 14A of the bracket 10A is not limited to less than 159 [mm].

Both ends of the rim facing surface 14A in the longitudinal direction constitute a pair of rim contact portions 15. Since the radius of curvature R1 of the rim facing surface 14A of the bracket 10A is smaller than the radius of curvature R2 of the outer peripheral surface 96A of the rim 96, the pair of rim contact portions 15 come into contact with two points in the circumferential direction of the outer peripheral surface 96A of the rim 96 so that the portion between the both ends of the rim facing surface 14A is spaced apart from the outer peripheral surface 96A of the rim 96.

As illustrated in FIG. 1, a first engagement hole 21 that engages with the first engagement protrusion 51 of the electric circuit unit 50A is formed in the first facing support portion 11, and a second engagement hole 22 that engages with the second engagement protrusion 52 of the electric circuit unit 50A is formed in the second facing support portion 12. The first engagement hole 21 has a rectangular shape corresponding to the cross-sectional shape of the first engagement protrusion 51. Furthermore, the first engagement hole 21 is arranged at substantially the center of the first facing support portion 11 in both the width direction and the height direction.

The second engagement hole 22 is formed at substantially the center of the second facing support portion 12 in the width direction from an upper end of the second facing support portion 12 to substantially the center in the height direction, and the upper end constitutes a protrusion receiving port 22A. Furthermore, a middle portion of the second engagement hole 22 in the height direction constitutes a retainer receiving portion 22B that widens in a stepped manner, and the second engagement hole 22, except for the retainer receiving portion 22B, has the same width as the first engagement hole 21. Furthermore, a protrusion receiving portion 22C under the retainer receiving portion 22B in the second engagement hole 22 has a height and a width of just a right size for the second engagement protrusion 52 to fit in.

A pair of locking holes 23 are formed on both sides of the second engagement hole 22 in the second facing support portion 12. Each locking hole 23 forms a vertically long rectangle, an inner upper surface of each locking hole 23 is arranged flush with an inner upper surface of the retainer receiving portion 22B, and an inner lower surface of each locking hole 23 is located below an inner lower surface of the retainer receiving portion 22B.

The electric circuit unit 50A is received between the first facing support portion 11 and the second facing support portion 12 of the bracket 10A as described below. That is, the electric circuit unit 50A is arranged to have an inclined posture in which the first engagement protrusion 51 and the second engagement protrusion 52 are aligned in a first direction inclined with respect to the direction in which the first facing support portion 11 and the second facing support portion 12 face each other, and then the electric circuit unit 50A is moved in the first direction so that the first engagement protrusion 51 is inserted into the first engagement hole 21 from the locking ridge 51A side.

Then, the electric circuit unit 50A is rotated in a second direction, which is downward, with the first engagement protrusion 51 as a fulcrum so that the second engagement protrusion 52 is inserted into the second engagement hole 22 from above, and thus the second engagement protrusion 52 is received by the protrusion receiving portion 22C at a lower end of the second engagement hole 22. Then, below the first engagement protrusion 51 and the second engagement protrusion 52, the tip surfaces of the rectangular protrusions 54T become adjacent to the first facing support portion 11 and the second facing support portion 12. In this way, the electric circuit unit 50A is attached to the bracket 10A through a two-step operation and brought into a state in which all movements and rotations other than the reverse of the second direction (that is, other than an upward rotation) are restricted. In this state, a retainer main body 71 described later of the retainer 70A is inserted into the retainer receiving portion 22B in the second engagement hole 22 from a direction intersecting the second direction, and the electric circuit unit 50A is restricted from the reverse of the second direction.

The retainer 70A is, for example, a resin injection-molded product, and has the retainer main body 71 of a flat rectangular parallelepiped that perfectly fits in the retainer receiving portion 22B. A structure of the retainer 70A will be described below in detail with reference to FIG. 3, with the direction in which the retainer main body 71 is fitted into the retainer receiving portion 22B as the front-rear direction of the retainer 70A. Stopper protrusions 74 protrude from rear ends at both side edges of an upper surface of the retainer main body 71 and from rear ends at both side edges of a lower surface of the retainer main body 71. Each of the stopper protrusions 74 has a quadrangular cross section and extends in the front-rear direction, and all the stopper protrusions 74 have front surfaces that are flat surfaces arranged flush with each other.

From rear end edges of both side surfaces of the retainer main body 71, a pair of lock arms 72 jut laterally then bend at a right angle and extend frontward. Furthermore, a tip portion of each of the lock arms 72 has a locking projection 73 that is arrowhead-shaped and protrudes toward the retainer main body 71. Moreover, upper surfaces of the pair of lock arms 72 are arranged flush with the upper surface of the retainer main body 71, and lower surfaces of the pair of lock arms 72 are located below the lower surface of the retainer main body 71 and connected to the stopper protrusions 74.

Figure 4:
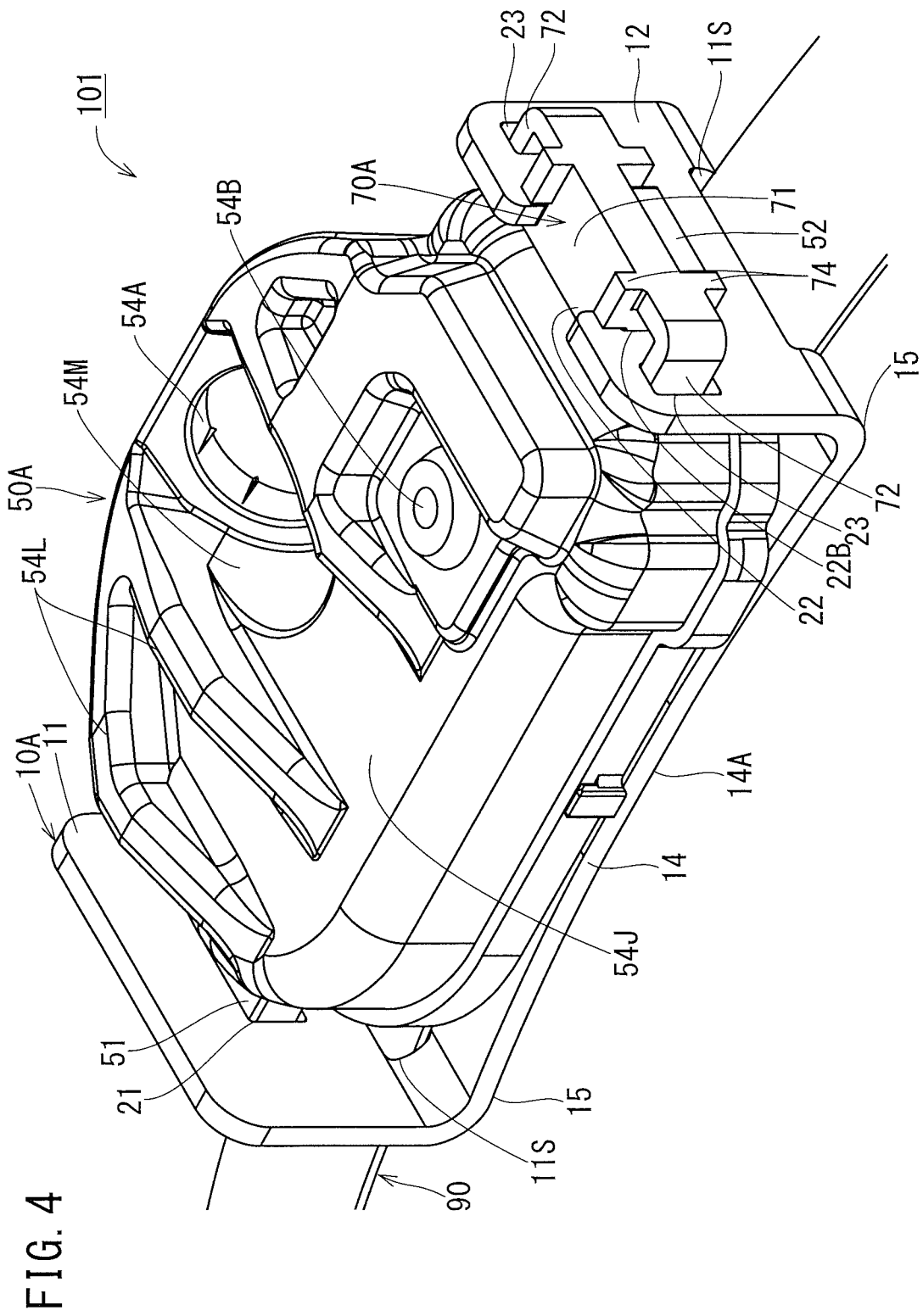
FIG. 4 is a perspective view of the in-tire electric device in an assembled state.

The retainer main body 71 is pushed into the retainer receiving portion 22B in the second engagement hole 22 of the second facing support portion 12, and the pair of lock arms 72 are pushed into the pair of locking holes 23 of the second facing support portions 12, and thus the retainer 70A is mounted on the bracket 10A as illustrated in FIG. 4. Then, in the mounting process, inclined surfaces at the tips of the locking projections 73 come into sliding contact with opening edges of the pair of locking holes 23, and the lock arms 72 are elastically deformed. When the stopper protrusions 74 come into contact with an opening edge of the second engagement hole 22, the pair of lock arms 72 elastically return. As a result, the locking projections 73 of the pair of lock arms 72 are locked to the opening edges of the pair of locking holes 23. Then, the retainer 70A prevents the second engagement protrusion 52 of the electric circuit unit 50A from coming off the second engagement hole 22. In the present embodiment, the lock arms 72 and the locking holes 23 correspond to "retainer locking portions" in the claims.

This concludes the description of the configuration of the in-tire electric device 101 of the present embodiment. Next, the operation and effect of the in-tire electric device 101 will be described. The belt 90 is passed through a pair of the slits 11S of the bracket 10A as illustrated in FIG. 1, and the belt 90 is wound around the rim 96 as illustrated in FIG. 6. Then, the pair of rim contact portions 15 of the bracket 10A come into contact with two points in the circumferential direction of the outer peripheral surface 96A of the rim 96 as described above. As a result, the bracket 10A does not wobble on the outer peripheral surface 96A of the rim 96, and is fixed to the outer peripheral surface 96A of the rim 96 more stably than before. Furthermore, the base portion 14 of the bracket 10A provided with the pair of rim contact portions 15 at both ends has an arc shape, and this prevents stress concentration. Furthermore, a pair of rounded bent portions between both ends of the base portion 14 having an arc shape and the first facing support portion 11 and the second facing support portion 12 constitute the pair of rim contact portions 15, and this prevents the pair of rim contact portions 15 from digging into the outer peripheral surface 96A of the rim 96. Moreover, the pair of rim contact portions 15 extend in the width direction of the outer peripheral surface 96A of the rim 96, and the portions in contact with the outer peripheral surface 96A of the rim 96 are linear. This prevents wobbling of the bracket 10A also in the width direction of the outer peripheral surface 96A of the rim 96.

Figure 7:
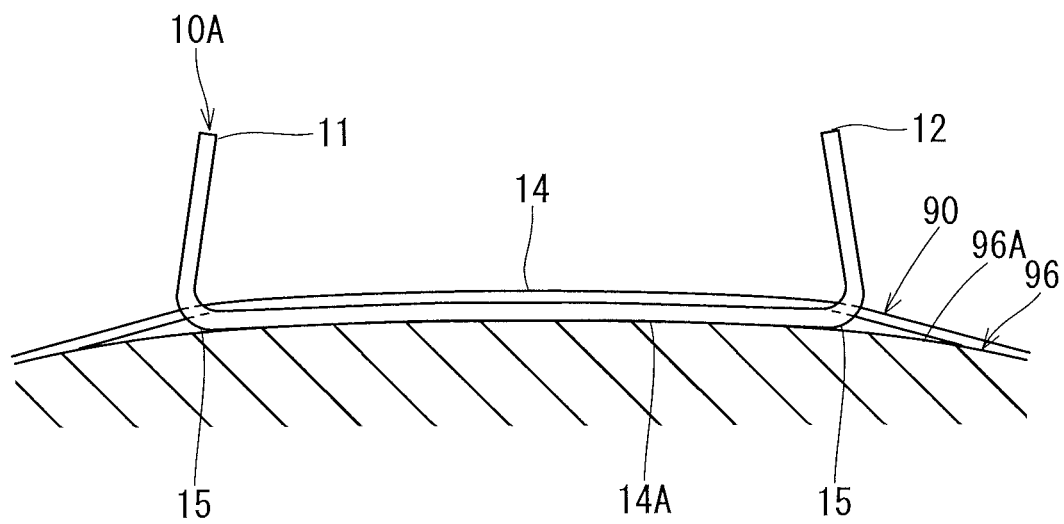
FIG. 7 is a side view of the bracket fixed to the outer peripheral surface of the rim.

Furthermore, when the belt 90 is tightened, the base portion 14 of the bracket 10A sags and the first facing support portion 11 and the second facing support portion 12 tilt toward each other as illustrated in FIG. 7. As a result, the electric circuit unit 50A is supported more strongly by the portion between the first facing support portion 11 and the second facing support portion 12. Furthermore, an elastic force of the base portion 14 applies tension to the belt 90, which also has an effect of allowing the belt 90 to be stably wound around the rim 96. Moreover, even when the belt 90 is strongly tightened, the portion between the both ends of the rim facing surface 14A comes into contact with the outer peripheral surface 96A of the rim 96, and this prevents excessive deformation of the base portion 14.

As in the bracket 10A of the present embodiment, the entire rim facing surface 14A of the base portion 14 may be brought into contact with the outer peripheral surface 96A of the rim 96, or, for example, a protrusion protruding downward from the base portion 14 may be brought into contact with the outer peripheral surface 96A of the rim 96. Furthermore, the entire base portion 14 may be pressed by the belt 90 as in the bracket 10A of the present embodiment, or, for example, a protrusion protruding upward from the base portion 14 may be pressed by the belt 90.

Furthermore, in the in-tire electric device 101 of the present embodiment, as described above, the electric circuit unit 50A is attached through two-step operation including an operation of moving the electric circuit unit 50A in the first direction with respect to the bracket 10A and an operation of rotating the electric circuit unit 50A in the second direction so that all movements and rotations except for the reverse of the second direction are restricted. Then, the retainer 70A is mounted on the bracket 10A from the direction intersecting the second direction so that the electric circuit unit 50A is restricted from moving in the second direction. In this way, the electric circuit unit 50A is held by the bracket 10A through an operation including a plurality of steps in different operation directions. It is therefore possible to allow the electric circuit unit 50A to be strongly held by the bracket 10A even in a case where a portion for locking the retainer 70A to the bracket 10A (lock arms 72) has a small elastic force and elastically deforms easily in the last step of operation. That is, according to the in-tire electric device 101 of the present embodiment, the electric circuit unit 50A can be easily attached to the bracket 10A, and the force with which the electric circuit unit 50A is held by the bracket 10A can be increased than before.

Second Embodiment

Hereinafter, an in-tire electric device 102 of a second embodiment of the present disclosure will be described with reference to FIGS. 8 to 13, and the description will include only differences in configuration from the first embodiment. An electric circuit unit 50B of the present embodiment has a pair of support protrusions 60 in place of the first engagement protrusion 51 and the second engagement protrusion 52 of the first embodiment. The pair of support protrusions 60 protrude in opposite directions from both end surfaces in the longitudinal direction of a housing 54 of the electric circuit unit 50B, and engagement protrusions 61 hang downward from tip portions of the pair of support protrusions 60. The support protrusions 60 have a structure in which a reinforcing rib 60B is provided on an outer edge of an upper surface of a trapezoidal protruding piece 60A that gradually narrows toward a tip.

Each of the engagement protrusions 61 has a lower end portion wider than a base end portion 61A. Specifically, the base end portions 61A of the engagement protrusions 61 have a rectangular plane cross-sectional shape that is long in a direction perpendicular to the direction in which the pair of support protrusions 60 are aligned, and lower end portions of the engagement protrusions 61 jut toward both sides and constitute foot portions 61B having a rectangular plane cross-sectional shape that is longer and thinner than the rectangular plane cross-sectional shape of the base end portions 61A.

A bracket 10B of the present embodiment is a resin injection-molded product, and extends in a circumferential direction of an outer peripheral surface 96A of a rim 96. Furthermore, the entire upper surface of the bracket 10B is flat except for both ends, and a pair of pedestal protrusions 24 protrude from the both ends. On the other hand, as illustrated in FIG. 13, the entire lower surface of the bracket 10B is continuously curved in an arc shape except for both ends, and rim contact portions 17 protrude downward from the both ends.

Figure 8:
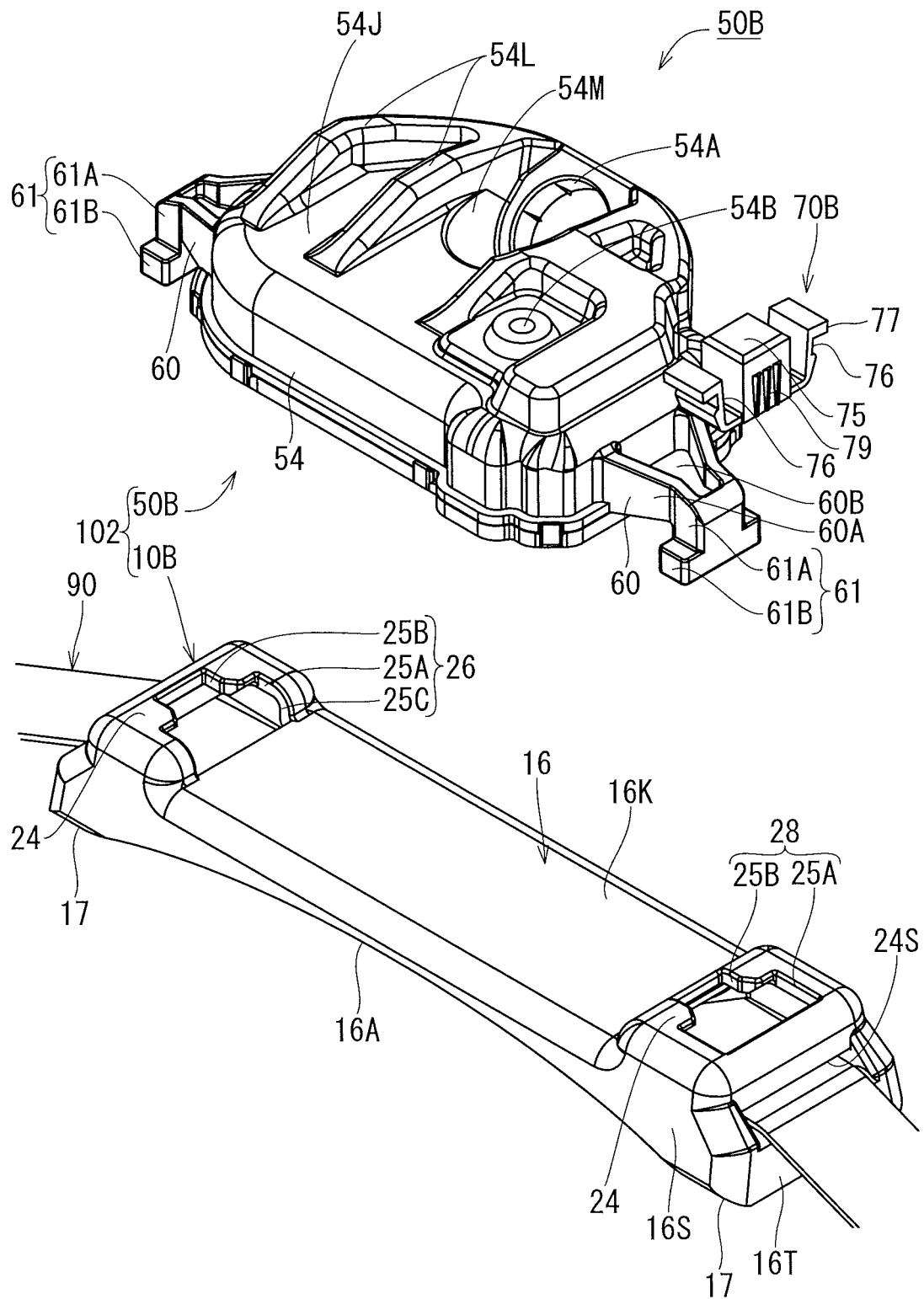
FIG. 8 is a perspective view of an in-tire electric device in a disassembled state according to a second embodiment.

Specifically, as illustrated in FIG. 8, the pair of pedestal protrusions 24 have a substantially quadrangular planar shape, and a strip-shaped top plate portion 16K having the same width as the pair of pedestal protrusions 24 connects between the pair of pedestal protrusions 24. Furthermore, a pair of side walls 16S and a pair of end walls 16T hang from an outer edge of an upper surface wall portion constituted by the pair of pedestal protrusions 24 and the top plate portion 16K. Then, the entire bracket 10B except for the pair of pedestal protrusions 24 constitutes a base portion 16.

Figure 10:
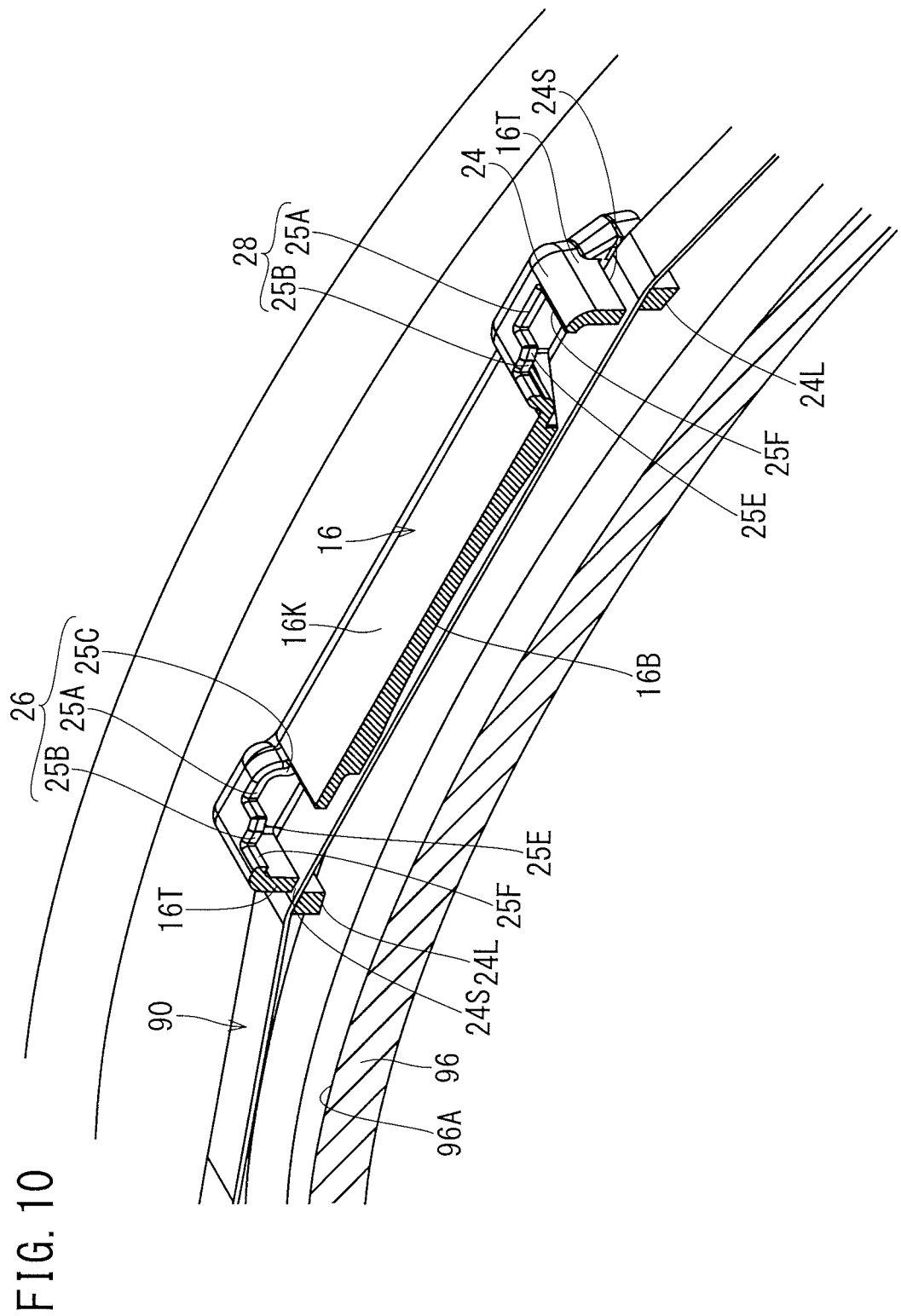
FIG. 10 is a partially broken perspective view of the bracket fixed to a tire wheel.

As illustrated in FIG. 8, a rim facing surface 16A, which is a lower surface of the pair of side walls 16S, is curved in an arc shape. As illustrated in FIG. 10, a rim facing surface 16B, which is a lower surface of the top plate portion 16K, is also curved in an arc shape. Then, a radius of curvature R1 of the rim facing surfaces 16A and 16B is smaller than a radius of curvature R2 of the outer peripheral surface 96A of the rim 96 (see FIG. 6).

Figure 13:
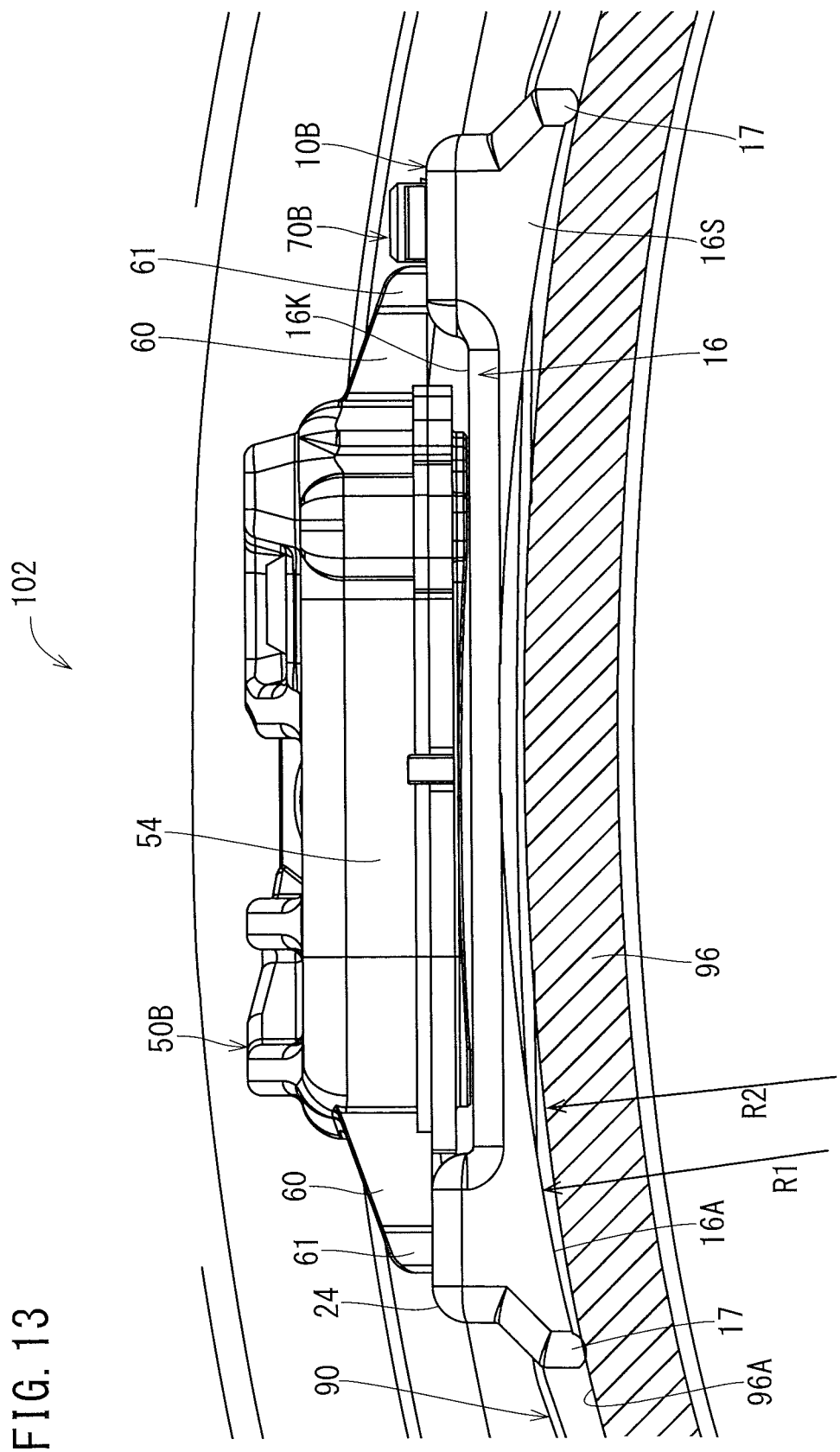
FIG. 13 is a side view of the in-tire electric device fixed to the tire wheel.

As illustrated in FIG. 13, the rim contact portions 17 are constituted by lower end portions of the pair of end walls 16T that protrude below lower end portions of the side walls 16S, and have a semi-circular cross-sectional shape that connects between the inner and outer surfaces of the end walls 16T when viewed in the width direction of the base portion 16. Furthermore, the rim contact portions 17 are arranged only at both ends of the end walls 16T in the width direction. As illustrated in FIG. 10, flat surfaces 24L located above the rim contact portions 17 are formed in central portions of the end walls 16T in the width direction. That is, in the present embodiment, the rim contact portions 17 are arranged at four corners of the lower surface of the bracket 10B. The rim contact portions 17 may be hemispherical.

Furthermore, a pair of slits 24S are formed in intermediate portions of the pair of end walls 16T in the vertical direction. Then, a belt 90 that has been passed through the pair of slits 24S is wound around the outer peripheral surface of the rim 96, and the bracket 10B is fixed to the rim 96 in a state where the rim contact portions 17 is pressed against the outer peripheral surface 96A of the rim 96 as illustrated in FIG. 13. Furthermore, in the present embodiment, an intermediate portion of the base portion 16 in the longitudinal direction is located above the belt 90, and is not pushed toward the rim 96 by the belt 90. As a result, even when the belt 90 is strongly tightened, the base portion 16 does not sag unlike the bracket 10A of the first embodiment, and only a pair of the rim contact portions 17 are pressed against the outer peripheral surface 96A of the rim 96.

As illustrated in FIG. 8, a first engagement hole 26 is formed in one of the pair of pedestal protrusions 24, and a second engagement hole 28 is formed in the other of the pair of pedestal protrusions 24. The first engagement hole 26 is constituted by a wide portion 25C that opens on the side surface, of the one pedestal protrusion 24, facing the other pedestal protrusion 24, a wide portion 25A that is continuous with the wide portion 25C with the same opening width and opens on an upper surface of the one pedestal protrusion 24, and a narrow portion 25B that is continuous with the wide portion 25A on the side opposite to the wide portion 25C and opens on the upper surface of the pedestal protrusion 24 with a width narrower than the wide portion 25A. Furthermore, the wide portions 25A and 25C have just a suitable opening width for the foot portion 61B of the engagement protrusion 61 to pass through, and the narrow portion 25B has just a suitable opening width for the base end portion 61A of the engagement protrusion 61 to pass through. On the other hand, the second engagement hole 28 has a shape obtained by removing the wide portion 25C from the first engagement hole 26, and opens on an upper surface of the second pedestal protrusion 24.

Figure 11:
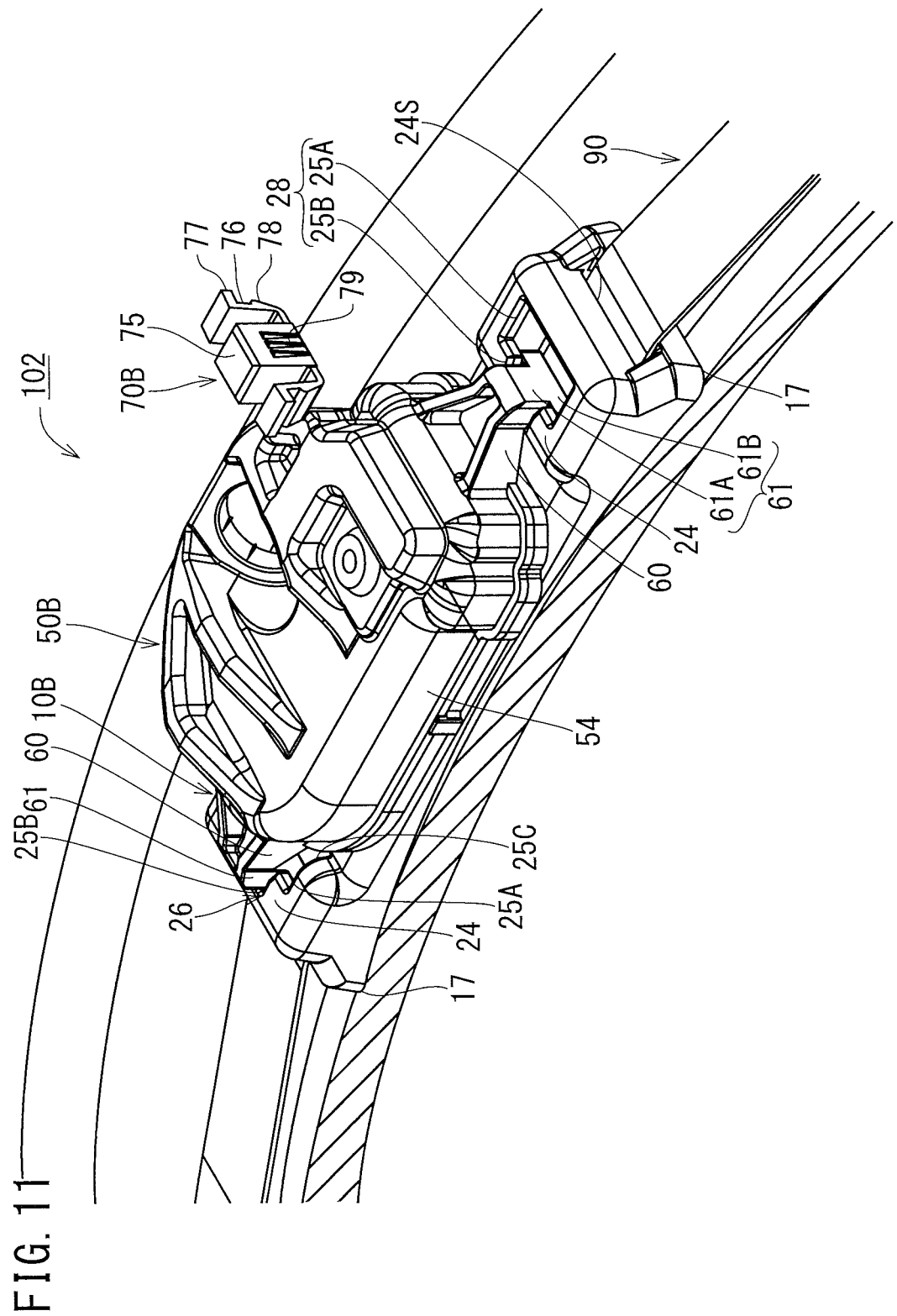
FIG. 11 is a perspective view of the in-tire electric device in the middle of being assembled.

Then, after a two-step operation of moving the electric circuit unit 50B in a first direction (downward) so that a pair of the engagement protrusions 61 of the electric circuit unit 50B are inserted into the wide portion 25A or the wide portion 25C of the first engagement hole 26 and the wide portion 25A of the second engagement hole 28, and then moving the electric circuit unit 50B in a second direction perpendicular to the first direction so that the base end portions 61A of the pair of the engagement protrusions 61 are received by the narrow portion 25B of the first engagement hole 26 and the narrow portion 25B of the second engagement hole 28, a lower surface of the electric circuit unit 50B comes into contact with an upper surface of the top plate portion 16K of the base portion 16 as illustrated in FIG. 13. In this state, upper surfaces of the foot portions 61B are located slightly below lower surfaces of upper surface walls of the pedestal protrusions 24 as illustrated in FIG. 11, and all movements and rotations except for the reverse of the second direction are restricted. Furthermore, the same state can be obtained also in a case where the pair of the engagement protrusions 61 are inserted into the first engagement hole 26 and the second engagement hole 28 without distinction between the engagement protrusions 61. In this state, a retainer 70B is inserted into the wide portion 25A of the second engagement hole 28 from a direction intersecting the second direction, and the electric circuit unit 50B is also restricted from a reverse movement of the second direction.

Figure 9:
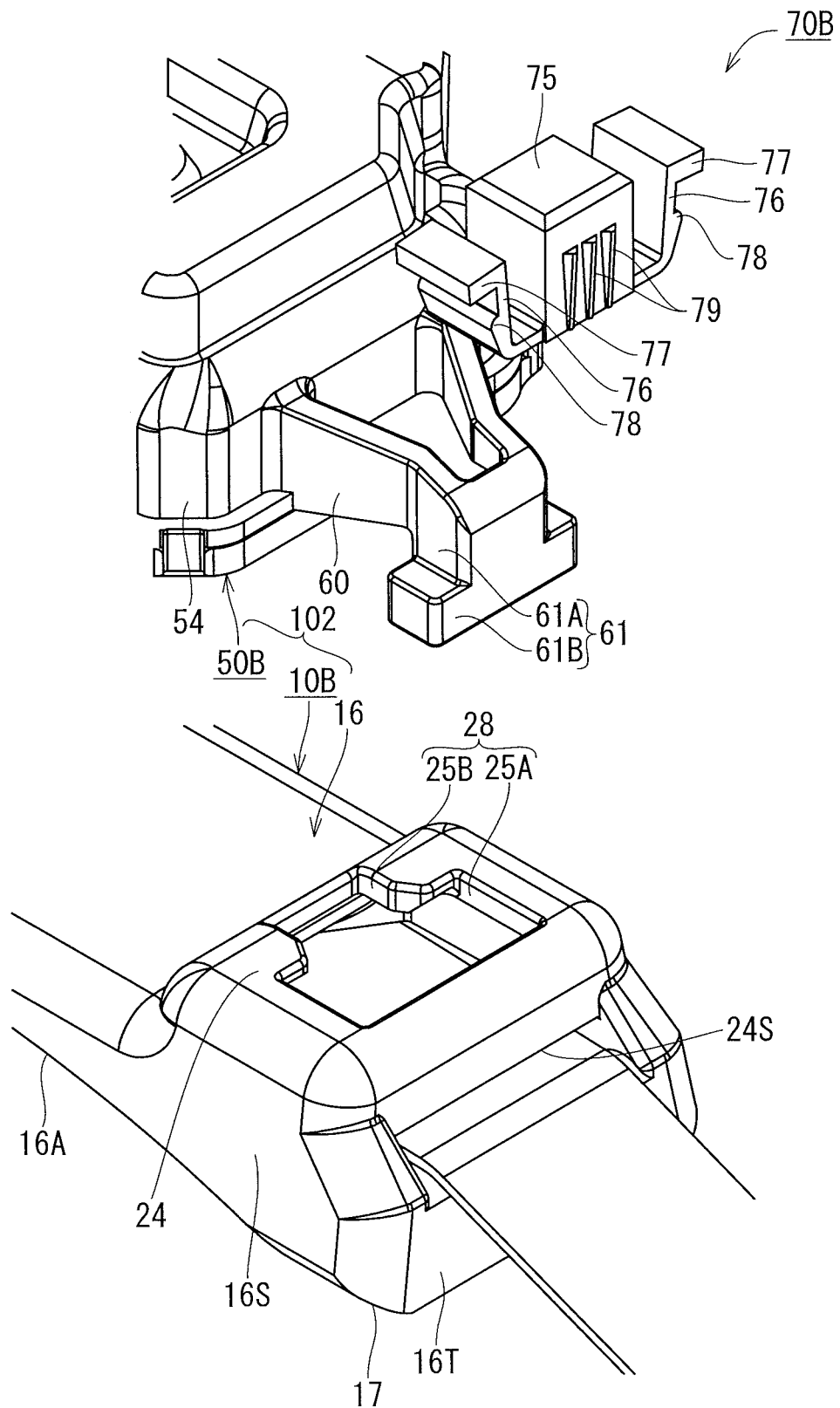
FIG. 9 is a partially enlarged perspective view of an electric circuit unit and a bracket.

As illustrated in FIG. 9, the retainer 70B has a structure in which a pair of lock arms 76 jut laterally from lower edges of both side surfaces of a prismatic retainer main body 75, and then bend at a right angle and extend upward. Furthermore, upper end portions of the pair of lock arms 76 are bent at a right angle toward sides away from the retainer main body 75 to form locking pieces 77. Furthermore, ranges from lower ends to intermediate positions of portions that extend in the vertical direction in the pair of lock arms 76 constitute locking protrusions 78 that gradually jut away from the retainer main body 75 as the locking protrusions 78 extend upward from the lower ends. Moreover, a plurality of ridges 79 is provided on one side surface not having the lock arms 76 of the retainer main body 75. The ridges 79 have a trapezoidal cross section, and extend from the lower end of the one side surface of the retainer main body 75 to a position close to the upper end, and the amount of protrusion from the retainer main body 75 gradually increases as the ridges 79 extend upward.

Figure 12:
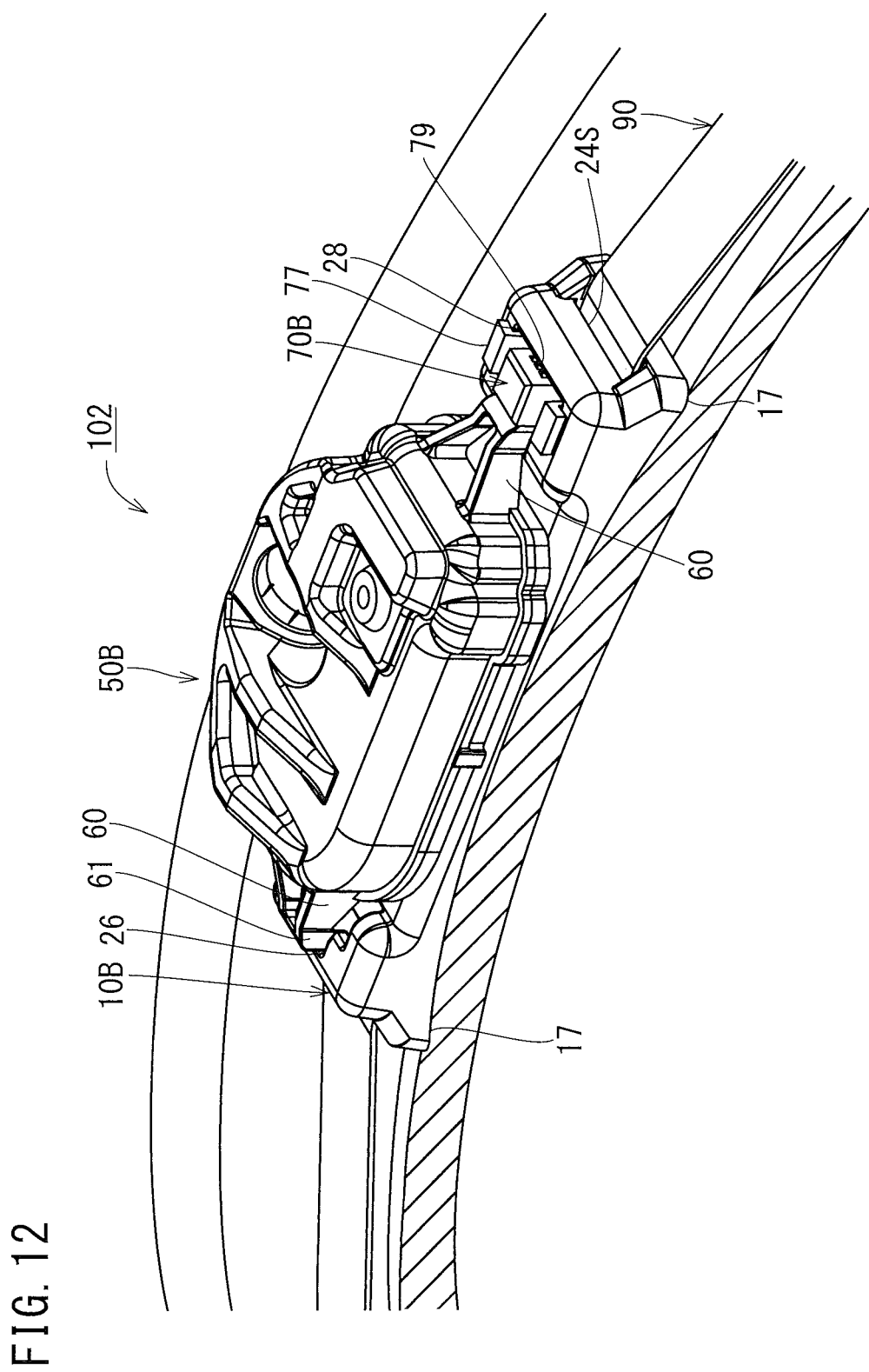
FIG. 12 is a perspective view of the in-tire electric device in an assembled state.

The retainer 70B is pushed from above into the wide portion 25A of the second engagement hole 28. Then, inclined surfaces of the locking protrusions 78 of the pair of lock arms 76 come into sliding contact with an opening edge of a wide portion 25A, and the lock arms 76 are elastically deformed. When the locking piece 77 at the upper end of each lock arm 76 comes into contact with the opening edge on an upper surface of the wide portion 25A as illustrated in FIG. 12, the locking protrusions 78 pass through the wide portion 25A of the second engagement hole 28, and the pair of lock arms 76 elastically return. As a result, each of the locking protrusions 78 of the pair of lock arms 76 is locked to an opening edge on a lower surface of the wide portion 25A. Then, the retainer 70B restricts the electric circuit unit 50B from moving toward the wide portion 25A. That is, as described above, the retainer 70B restricts the electric circuit unit 50B from a reverse movement of the second direction.

This concludes the description of the configuration of the in-tire electric device 102 of the present embodiment. Next, the operation and effect of the in-tire electric device 102 will be described. As in the case of the bracket 10A of the first embodiment, the bracket 10B of the in-tire electric device 102 of the present embodiment also has the rim contact portions 17 that come into contact with two points in the circumferential direction of the outer peripheral surface 96A of the rim 96. This stabilizes the bracket 10B on the outer peripheral surface 96A of the rim 96. Furthermore, in the bracket 10B of the present embodiment, when the belt 90 is passed through the pair of slits 24S, the portion between the pair of slits 24S faces the outer peripheral surface 96A of the rim 96 interposing the belt 90 therebetween, and is unaffected by a load due to tightening of the belt 90. Thus, durability is improved.

Furthermore, in the in-tire electric device 102 of the present embodiment, as in the case of the above-mentioned in-tire electric device 102 of the first embodiment, the two-step operation for attaching the electric circuit unit 50B to the bracket 10B is performed, and then the operation of mounting the retainer 70B is performed so that the electric circuit unit 50B is held by the bracket 10B. This allows the electric circuit unit 50B to be easily attached to the bracket 10B, and the force with which the electric circuit unit 50B is held by the bracket 10B can be increased than before. Moreover, in the in-tire electric device 102 of the present embodiment, the electric circuit unit 50B can be engaged with the first engagement hole 26 and the second engagement hole 28 of the bracket 10B without distinction between the pair of the engagement protrusions 61, and this is highly convenient.

Third Embodiment

Figure 14:
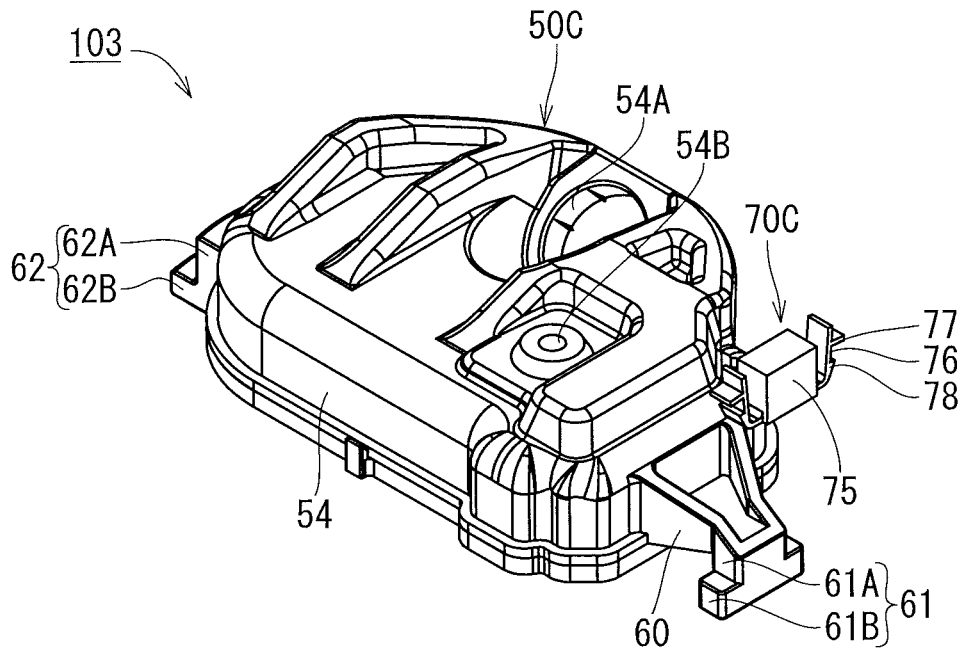
FIG. 14 is a perspective view of an in-tire electric device in a disassembled state according to a third embodiment.
Figure 14:
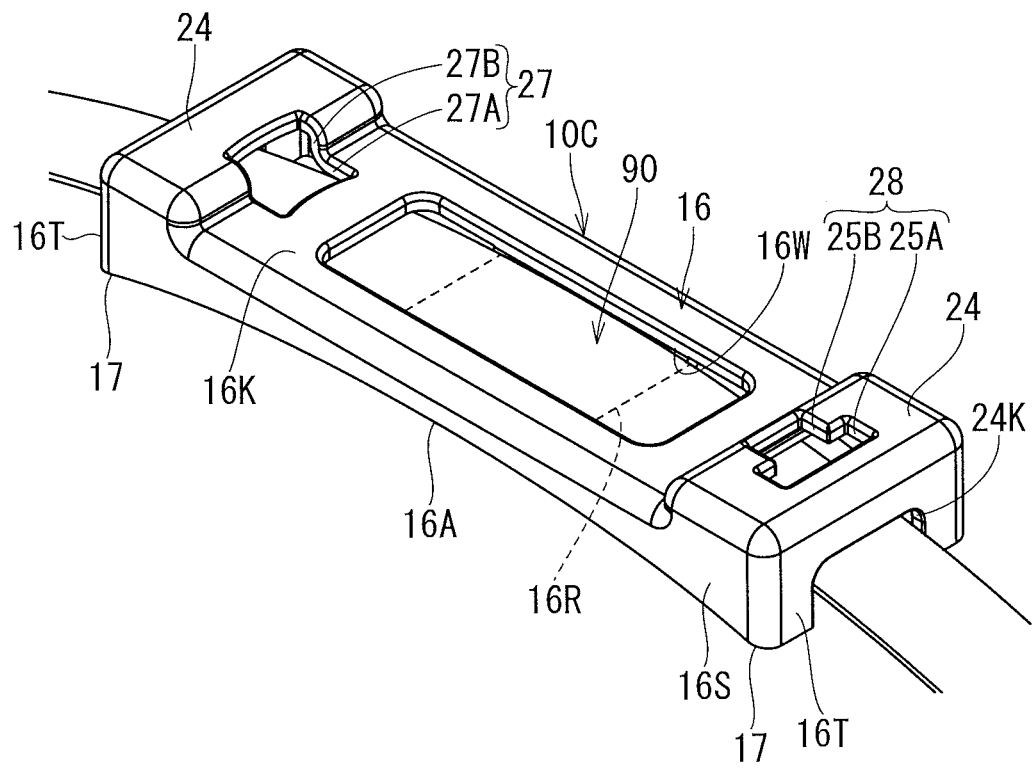
Figure 15:
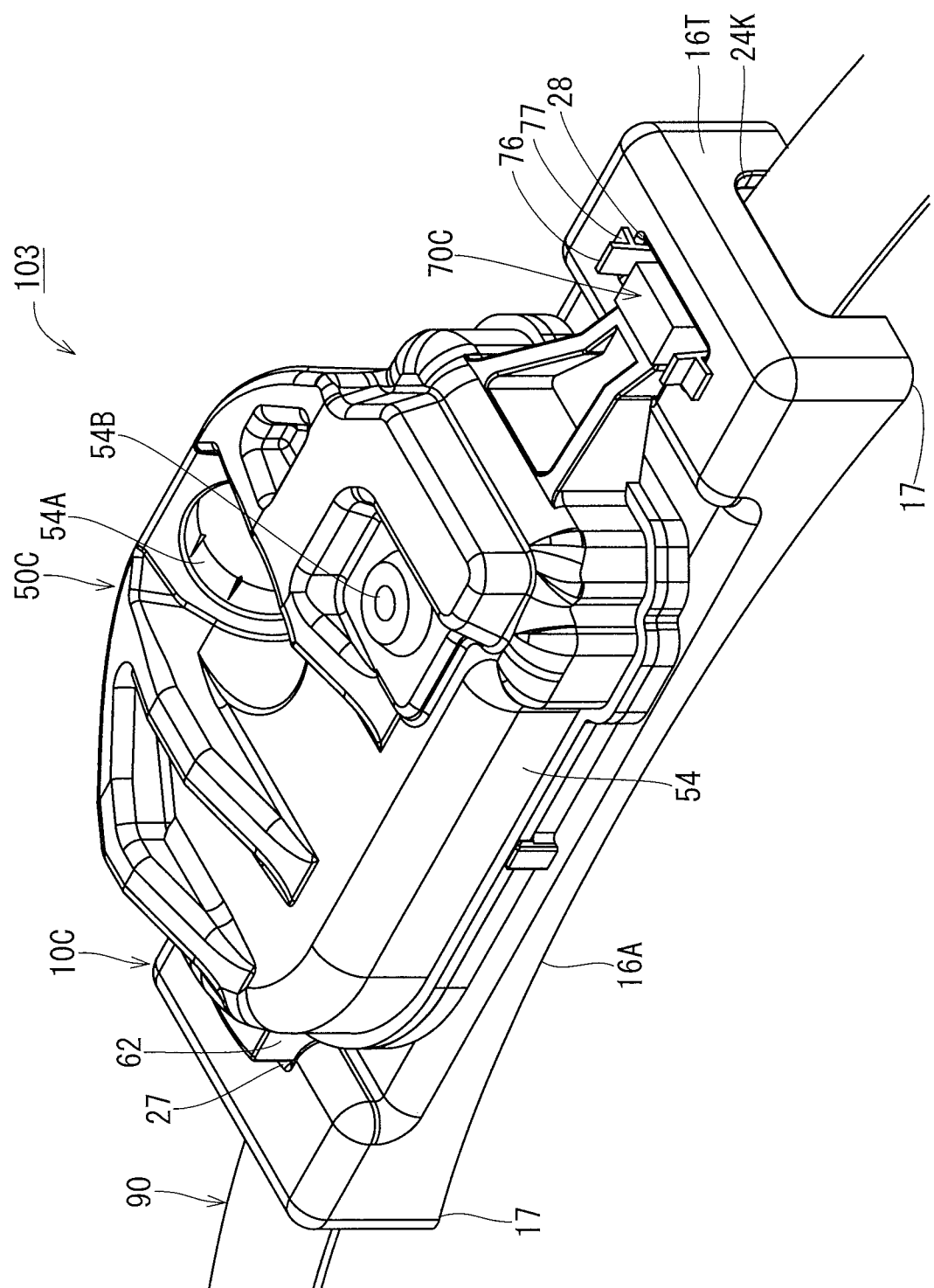
FIG. 15 is a perspective view of the in-tire electric device in an assembled state.

Hereinafter, an in-tire electric device 103 of a third embodiment of the present disclosure will be described with reference to FIGS. 14 and 15, and the description will include only differences in configuration from the second embodiment. As illustrated in FIG. 14, an electric circuit unit 50C of the present embodiment has an L-shaped engagement protrusion 62 in place of the support protrusion 60 and the engagement protrusion 61 on one side of the second embodiment. In the present embodiment, the "L-shaped engagement protrusion 62" corresponds to a "first engagement protrusion" in the claims, and an "engagement protrusion 61" on the other side corresponds to a "second engagement protrusion" in the claims. Furthermore, the first engagement protrusion 51 and the second engagement protrusion of the first embodiment described above correspond to "a first engagement protrusion and a second engagement protrusion" in the claims.

The L-shaped engagement protrusion 62 has a structure in which a lower end portion of a vertical side portion 62A extending in the vertical direction is bent at a right angle and constitutes a bent engagement piece 62B. Then, an upper end portion of the vertical side portion 62A is connected to one end surface of a housing 54 in the longitudinal direction, and the bent engagement piece 62B protrudes toward a side away from the housing 54.

A bracket 10C of the present embodiment includes a first engagement hole 27 having a shape different from that of the first engagement hole 26 of the bracket 10B of the second embodiment. The first engagement hole 27 includes a side surface opening portion 27B that opens on a side surface, of one of the pair of pedestal protrusions 24, facing the other of the pair of pedestal protrusions 24 and a base surface opening portion 27A that opens on an upper surface of a base portion 16.

The base portion 16 is formed with a rectangular opening 16W extending in the longitudinal direction thereof. Furthermore, a bridge portion 16R is bridged so as to cross below a central portion of the rectangular opening 16W in the longitudinal direction, and both ends of the bridge portion 16R are connected to an opening edge of the rectangular opening 16W on a lower surface of the base portion 16. Moreover, belt insertion openings 24K are formed in a pair of end walls 16T at both ends of the base portion 16 in the longitudinal direction. The belt insertion openings 24K have the same width as the rectangular opening 16W, and are formed by cutting portions below intermediate positions of the end walls 16T in the vertical direction. Then, a belt 90 is passed above the bridge portion 16R and inside a pair of the belt insertion openings 24K, and is wound around an outer peripheral surface 96A of a rim 96 (see FIG. 5).

Furthermore, a retainer 70C of the present embodiment has a structure obtained by extending the pair of lock arms 76 of the retainer 70B of the second embodiment above the locking pieces 77 and removing the plurality of ridges 79.

This concludes the description of the configuration of the in-tire electric device 103 of the present embodiment. In the bracket 10C of the in-tire electric device 103 of the present embodiment, as in the case of the bracket 10B of the second embodiment, rim contact portions 17 at both ends of the base portion 16 come into contact with two points in the circumferential direction of the outer peripheral surface 96A of the rim 96. This stabilizes the bracket 10C on the outer peripheral surface 96A of the rim 96.

Furthermore, in the in-tire electric device 103 of the present embodiment, as in the case of the above-mentioned in-tire electric device 102 of the first and second embodiments, the two-step operation for attaching the electric circuit unit 50C to the bracket 10C is performed, and then the operation of mounting the retainer 70C is performed, so that the electric circuit unit 50C is held by the bracket 10C. This allows the electric circuit unit 50C to be easily attached to the bracket 10C, and the force with which the electric circuit unit 50C is held by the bracket 10C can be increased than before.

Fourth Embodiment

Figure 16:
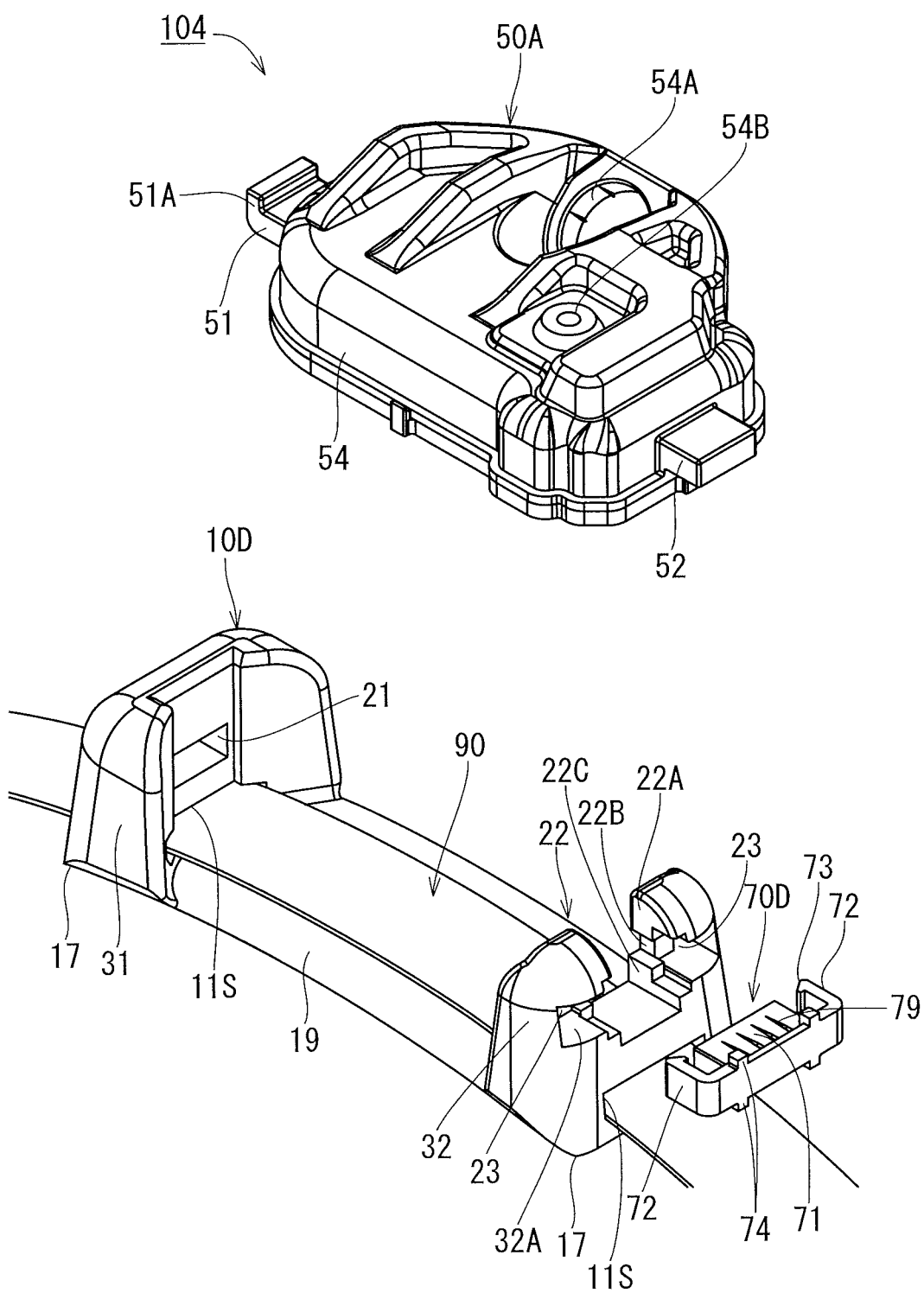
FIG. 16 is a perspective view of an in-tire electric device in a disassembled state according to a fourth embodiment.
Figure 17:
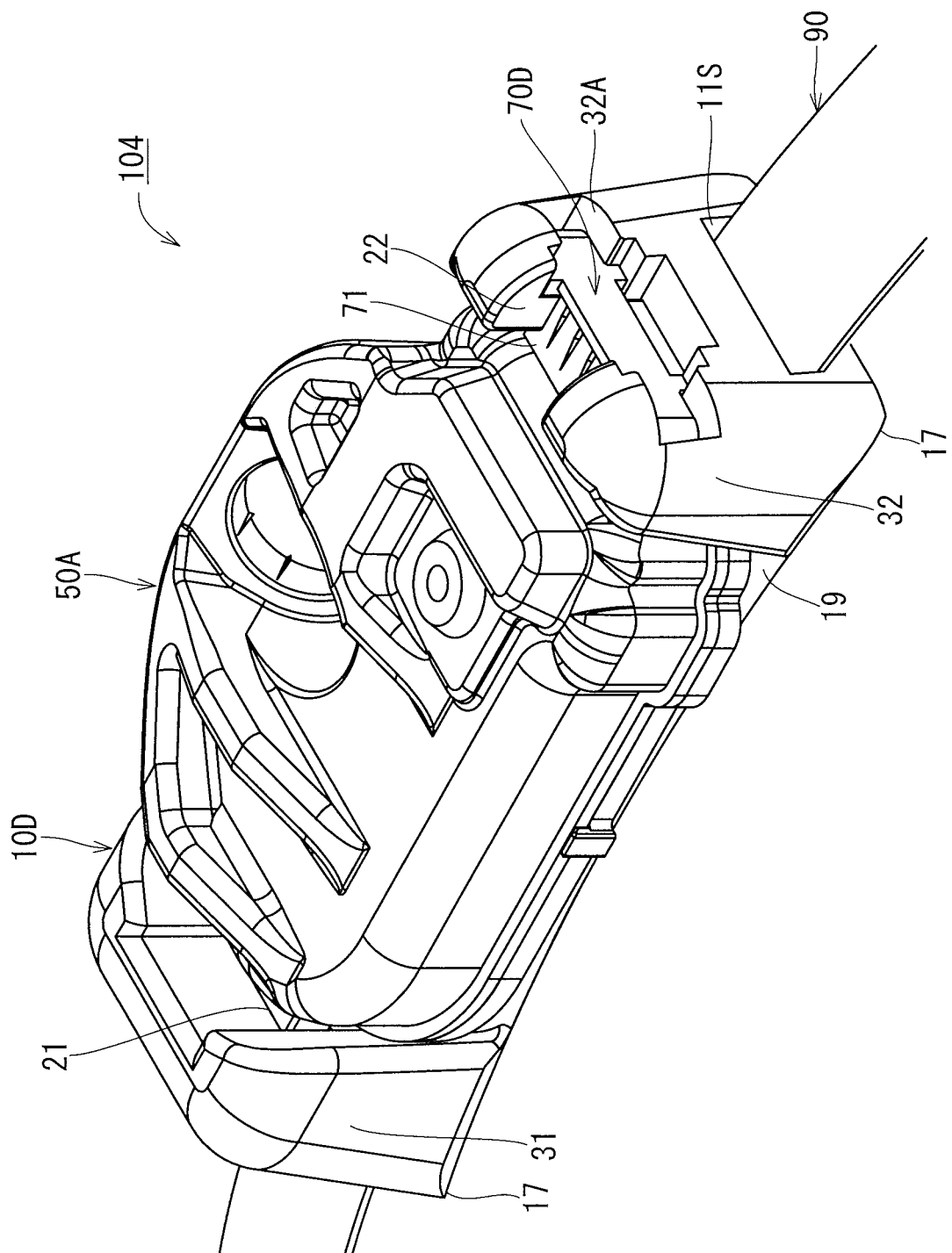
FIG. 17 is a perspective view of the in-tire electric device in an assembled state.

FIGS. 16 and 17 illustrate an in-tire electric device 104 of a fourth embodiment of the present disclosure. The in-tire electric device 104 includes a bracket 10D obtained by resinifying the bracket 10A of the in-tire electric device 101 of the first embodiment. Hereinafter, only differences in configuration from the first embodiment will be described.

The bracket 10D of the present embodiment is a resin injection-molded product in which a base portion 19 extending in the circumferential direction of a rim 96 is integrally provided with a first facing support portion 31 and a second facing support portion 32 at both ends. The base portion 19 has a groove shape in which both side portions of a strip extending in the circumferential direction of the rim 96 are curved downward. Furthermore, the base portion 19 is entirely curved so that lower surfaces of the both side portions are arc surfaces having a radius of curvature smaller than a radius of curvature of an outer peripheral surface 96A of the rim 96.

The first facing support portion 31 and the second facing support portion 32 are thicker than the plate-shaped first facing support portion 11 and second facing support portion 12 of the bracket 10A of the first embodiment, and surfaces facing each other are curved in accordance with the shape of side surfaces of an electric circuit unit 50A in the longitudinal direction. Then, the both ends of the base portion 19 are connected to lower end portions of the surfaces facing each other of the first facing support portion 31 and the second facing support portion 32. Moreover, lower surfaces of both side portions of the first facing support portion 31 and the second facing support portion 32 are arc surfaces that are continuous with the lower surfaces of the both side portions of the base portion 19. Then, on lower surfaces of the first facing support portion 31 and the second facing support portion 32, edges on opposite sides from the base portion 19 constitute a pair of rim contact portions 17.

In the longitudinal direction of the base portion 19, a pair of slits 11S pass through the first facing support portion 31 and the second facing support portion 32 at positions slightly above an upper surface of the base portion 19. Then, a belt 90 that has been passed through the pair of slits 11S is wound around the outer peripheral surface 96A of the rim 96 (see FIG. 5).

In the longitudinal direction of the base portion 19, a first engagement hole 21 passes through a portion above the slit 11S in the first facing support portion 31, and is engaged with a first engagement protrusion 51 of the electric circuit unit 50A. Furthermore, in the second facing support portion 32, a second engagement hole 22 is formed by cutting a portion above a position above the slit 11S. As in the case of the second engagement hole 22 of the bracket 10A of the first embodiment (see FIG. 1), the second engagement hole 22 has an upper end that constitutes a protrusion receiving port 22A, and is provided with a retainer receiving portion 22B at a middle portion of the second engagement hole 22 in the height direction, and a portion under the retainer receiving portion 22B constitutes a protrusion receiving portion 22C. A second engagement protrusion 52 of the electric circuit unit 50A perfectly fits in the protrusion receiving portion 22C.

Furthermore, as in the case of the bracket 10A of the first embodiment, a pair of locking holes 23 pass through, in the longitudinal direction of the base portion 19, the second facing support portion 32 at portions on both sides of the retainer receiving portion 22B. Moreover, a retainer receiving recess 32A having a structure obtained by enlarging the retainer receiving portion 22B toward both sides is formed on the second facing support portion 32 on the side opposite to the surface facing the first facing support portion 31, and the pair of locking holes 23 are opened inside the retainer receiving recess 32A. Then, as illustrated in FIG. 17, a retainer 70D having substantially the same shape as the retainer 70A of the first embodiment is fitted into the retainer receiving recess 32A. A retainer main body 71 of the retainer 70D is received by the retainer receiving portion 22B in the second engagement hole 22, and a pair of lock arms 72 of the retainer 70D engage with the pair of locking holes 23.

The retainer 70D of the present embodiment differs from the retainer 70A of the first embodiment in that a plurality of ridges 79 (see FIG. 9) similar to that of the retainer 70B of the second embodiment is provided on the upper surface, and that the width of the lock arms 72 is equal to the thickness of the retainer main body 71 in the vertical direction.

This concludes the description of the configuration of the in-tire electric device 104 of the present embodiment. In the bracket 10D of the in-tire electric device 104 of the present embodiment, as in the case of the bracket 10A of the first embodiment, the rim contact portions 17 at the both ends of the base portion 19 come into contact with two points in the circumferential direction of the outer peripheral surface 96A of the rim 96. This stabilizes the bracket 10D on the outer peripheral surface 96A of the rim 96.

Fifth Embodiment

Figure 18:
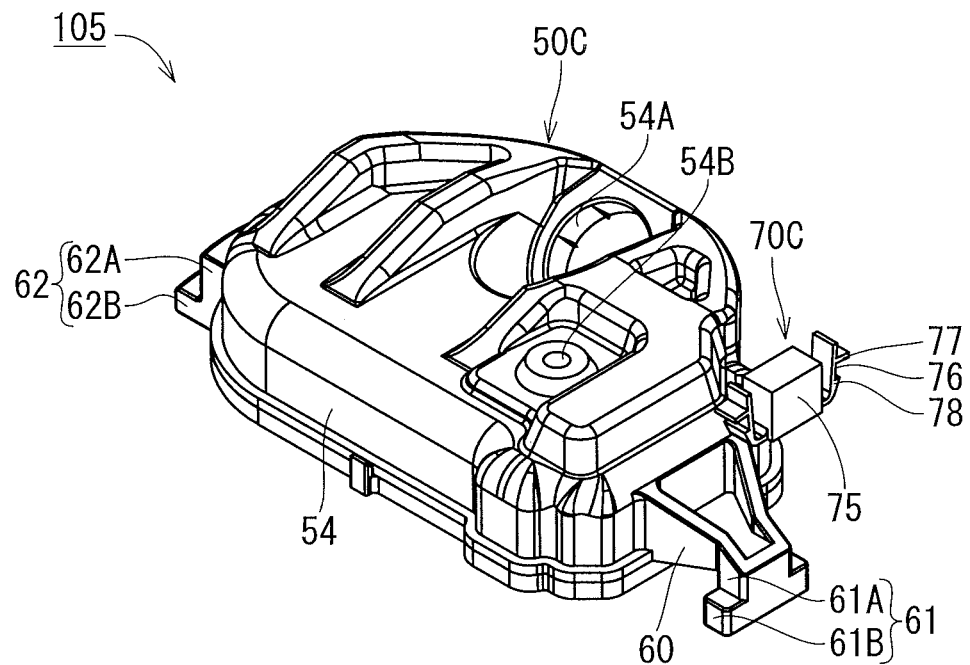
FIG. 18 is a perspective view of an in-tire electric device in a disassembled state according to a fifth embodiment.
Figure 18:
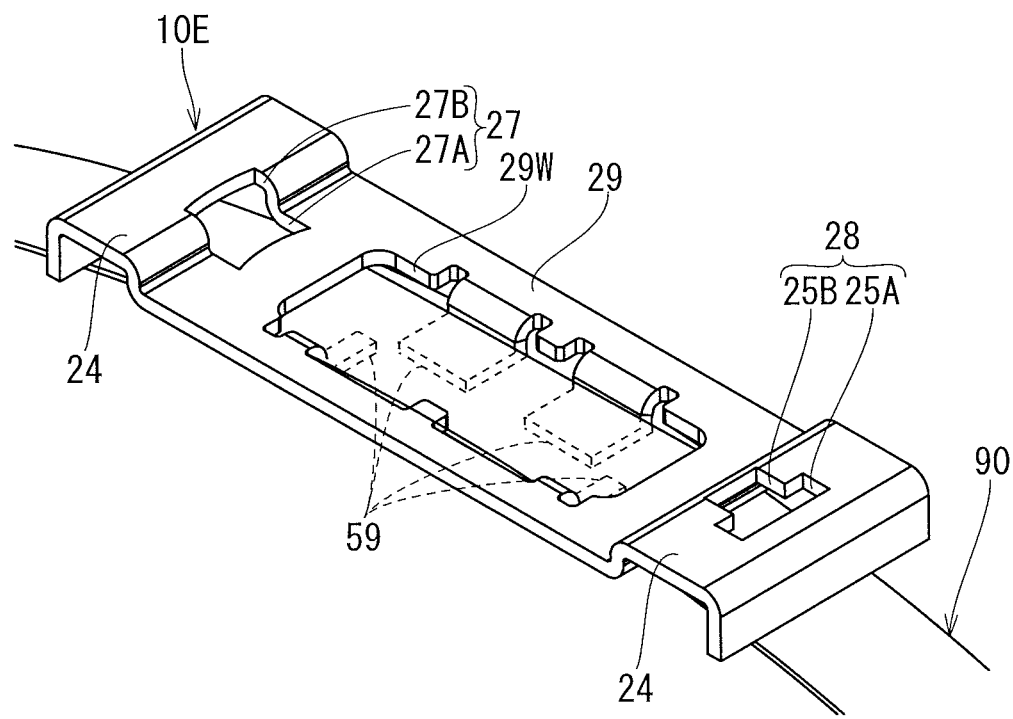
Figure 19:
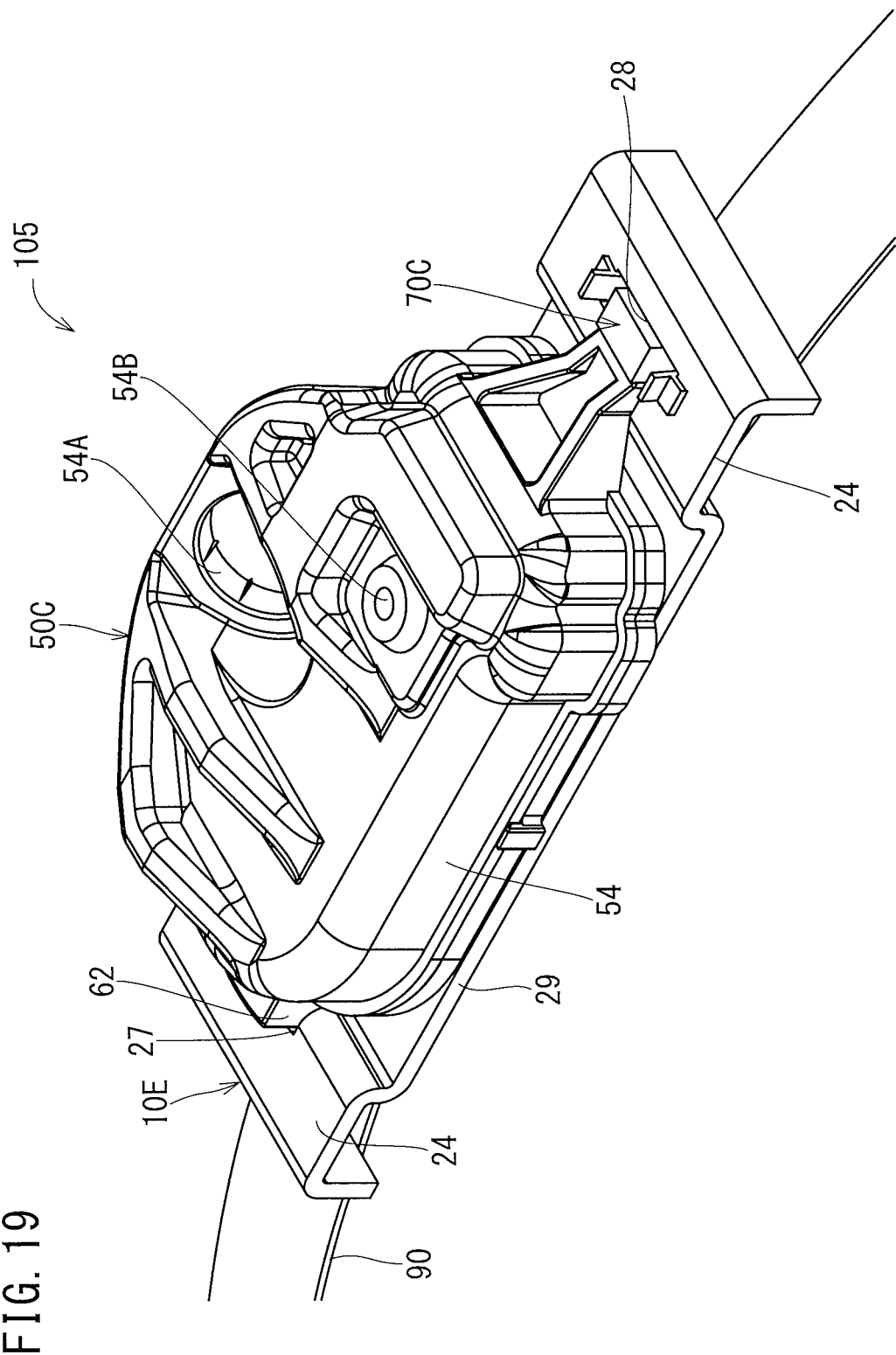
FIG. 19 is a perspective view of the in-tire electric device in an assembled state.

FIGS. 18 and 19 illustrate an in-tire electric device 105 of a fifth embodiment of the present disclosure. The in-tire electric device 105 includes a metal bracket 10E instead of the resin bracket 10C of the in-tire electric device 103 of the third embodiment. Hereinafter, only differences in configuration from the first embodiment will be described.

The bracket 10E includes a pair of pedestal protrusions 24 constituted by both ends of a strip-shaped sheet metal bent so as to protrude upward and form U-shaped grooves. Then, the first engagement hole 27 described in the third embodiment is formed on one of the pair of pedestal protrusions 24, and the second engagement hole 28 described in the third embodiment is formed on the other of the pair of pedestal protrusions 24. Furthermore, in a base portion 29 between the pair of pedestal protrusions 24 of the bracket 10E, a rectangular window 29W extending in the longitudinal direction of the base portion 29 is formed, and a plurality of protruding pieces juts toward the inside of the rectangular window 29W from outer edges on a pair of long sides of the rectangular window 29W, and is bent into a crank-like shape. Then, portions from the bent portions to tips of those protruding pieces constitute a plurality of belt support portions 59 facing the rectangular window 29W from below. A belt 90 that has been passed on the belt support portions 59 is wound around a rim 96, and thus the bracket 10E is fixed to the rim 96. Then, an electric circuit unit 50C can be attached to the bracket 10E in the same sequence as that for the in-tire electric device 103 of the third embodiment. With the configuration of the present embodiment, as in the case of the in-tire electric device 103 of the third embodiment, the force with which the electric circuit unit 50C is held by the bracket 10E can be increased than before.

Other Embodiments (1) In each of the above-described embodiments, the electric circuit unit is provided with the engagement protrusions, and the bracket is provided with the engagement holes. Alternatively, the electric circuit unit may be provided with the engagement holes, and the bracket may be provided with the engagement protrusions.

(2) In each of the above-described embodiments, the electric circuit unit and the bracket are provided with two engagement protrusions and two engagement holes, respectively. Alternatively, one engagement protrusion and one engagement hole may be provided.

(3) The bracket of each of the above-described embodiments has a long shape in which the circumferential direction of the outer peripheral surface 96A of the rim 96 is longer than the width direction. Alternatively, the bracket may have a long shape in which the width direction is longer than the circumferential direction, or may have a shape in which the size in the circumferential direction is substantially the same as the size in the width direction.

(4) The retainer of each of the above-described embodiments is received by the engagement holes of the bracket where the engagement protrusions of the electric circuit unit are engaged, and the engagement protrusions are restricted from coming off the engagement holes so that the electric circuit unit is restricted from a rotation and a reverse movement of the second direction described above. Alternatively, the retainer may be engaged at a position in the bracket different from the engagement holes where the engagement protrusions of the electric circuit unit are engaged, so that the electric circuit unit is restricted from a rotation and a reverse movement of the second direction described above.

REFERENCE SIGNS LIST 10A to 10E Bracket
11, 31 First facing support portion
11S, 24S Slit
12, 32 Second facing support portion
14, 16, 19 Base portion
14A, 16A, 16B Rim facing surface
15, 17 Rim contact portion
21, 26, 27 First engagement hole
22, 28 Second engagement hole
22A Protrusion receiving port
22B, 25A Retainer receiving portion
24 Pedestal protrusion
50A to 50C Electric circuit unit
51 First engagement protrusion
52 Second engagement protrusion
61, 62 Engagement protrusion
61A Base end portion
61B Foot portion
62B Bent engagement piece
70A to 70D Retainer
72, 76 Lock arm
90 Belt
95 Tire wheel
96 Rim
96A Outer peripheral surface
99 Tire
101 to 105 In-tire electric device
110 Electric circuit
111 Pressure sensor
114 Wireless circuit
R1 Radius of curvature
R2 Radius of curvature

The invention claimed is:

1. An in-tire electric device that includes a bracket fixed to an outer peripheral surface of a rim of a tire wheel by a belt wound around the outer peripheral surface of the rim and an electric circuit unit detachably held by the bracket, the in-tire electric device comprising:
   an engagement protrusion and an engagement hole that are provided on the electric circuit unit and the bracket and engage with each other in such a way as to restrict, through a two-step operation in which the electric circuit unit is moved in a first direction with respect to the bracket and then moved or rotated in a second direction intersecting the first direction, all movements and rotations except for a reverse of the second direction;
   a retainer that is mounted on the bracket from a direction intersecting the second direction and faces the electric circuit unit in the second direction to restrict the electric circuit unit from moving in the second direction; and
   retainer locking portions that are formed on the bracket and the retainer and engage with each other by elastic deformation of one of the retainer locking portions to lock the retainer to the bracket, wherein
   the bracket is provided with a first facing support portion and a second facing support portion that protrude toward a side away from the outer peripheral surface of the rim and face each other with the electric circuit unit interposed between the first facing support portion and the second facing support portion,
   the engagement protrusion is constituted by a pair of engagement protrusions, including a first engagement protrusion and a second engagement protrusion that protrude from the electric circuit unit in opposite directions,
   the engagement hole is constituted by a pair of engagement holes, including a first engagement hole that passes through the first facing support portion in a direction facing the second facing support portion and allows the first engagement protrusion to be inserted from the first direction that is inclined with respect to the facing direction, and a second engagement hole that passes through the second facing support portion in a direction facing the first facing support portion, has a protrusion receiving port that opens on a tip surface or side surface of the second facing support portion, and receives the second engagement protrusion from the second direction that passes through the protrusion receiving port, and
   a retainer receiving portion that has a width of a middle portion of the second engagement hole enlarged in the second direction and allows the retainer to be inserted from a direction intersecting the second direction.

2. The in-tire electric device according to claim 1, wherein the pair of engagement protrusions are engageable with any of the pair of engagement holes.

3. The in-tire electric device according to claim 2, wherein the electric circuit unit includes a pressure sensor that detects a pressure in a tire and a wireless circuit that wirelessly transmits a detection result of the pressure sensor.

4. The in-tire electric device according to claim 1, wherein the electric circuit unit includes a pressure sensor that detects a pressure in a tire and a wireless circuit that wirelessly transmits a detection result of the pressure sensor.

5. An in-tire electric device that includes a bracket fixed to an outer peripheral surface of a rim of a tire wheel by a belt wound around the outer peripheral surface of the rim and an electric circuit unit detachably held by the bracket, the in-tire electric device comprising:
   an engagement protrusion and an engagement hole that are provided on the electric circuit unit and the bracket and engage with each other in such a way as to restrict, through a two-step operation in which the electric circuit unit is moved in a first direction with respect to the bracket and then moved or rotated in a second direction intersecting the first direction, all movements and rotations except for a reverse of the second direction;
   a retainer that is mounted on the bracket from a direction intersecting the second direction and faces the electric circuit unit in the second direction to restrict the electric circuit unit from moving in the second direction; and
   retainer locking portions that are formed on the bracket and the retainer and engage with each other by elastic deformation of one of the retainer locking portions to lock the retainer to the bracket, wherein
   the engagement protrusion is constituted by a pair of engagement protrusions that protrude from the electric circuit unit toward the outer peripheral surface of the rim, and have foot portions enlarged at tip portions with respect to base end portions in a third direction that is perpendicular to both the first direction in which the engagement protrusions protrude and the second direction in which the pair of engagement protrusions face each other,
   the bracket is provided with a pair of pedestal protrusions that protrude toward a side away from the outer peripheral surface of the rim and have, at tip portions, upper surface walls that are perpendicular to a direction in which the pair of pedestal protrusions protrude,
   the engagement hole is constituted by a pair of engagement holes that pass through the upper surface walls of the pair of pedestal protrusions,
   the pair of engagement holes are provided with wide portions suitable for the foot portions of the pair of engagement protrusions to pass through and narrow portions that are located on one side of the wide portions in the second direction and suitable for the base end portions of the pair of engagement protrusions to pass through, and
   the electric circuit unit is moved in the first direction, the pair of engagement protrusions are inserted into the wide portions of the pair of engagement holes and then moved in the second direction, the base end portions of the pair of engagement protrusions are engaged with the narrow portions of the pair of engagement holes, and then the retainer is inserted into the wide portions of any of the pair of engagement holes.

6. The in-tire electric device according to claim 5, wherein the pair of engagement protrusions are engageable with any of the pair of engagement holes.

7. The in-tire electric device according to claim 6, wherein the electric circuit unit includes a pressure sensor that detects a pressure in a tire and a wireless circuit that wirelessly transmits a detection result of the pressure sensor.

8. The in-tire electric device according to claim 5, wherein the electric circuit unit includes a pressure sensor that detects a pressure in a tire and a wireless circuit that wirelessly transmits a detection result of the pressure sensor.

9. An in-tire electric device that includes a bracket fixed to an outer peripheral surface of a rim of a tire wheel by a belt wound around the outer peripheral surface of the rim and an electric circuit unit detachably held by the bracket, the in-tire electric device comprising:
- an engagement protrusion and an engagement hole that are provided on the electric circuit unit and the bracket and engage with each other in such a way as to restrict, through a two-step operation in which the electric circuit unit is moved in a first direction with respect to the bracket and then moved or rotated in a second direction intersecting the first direction, all movements and rotations except for a reverse of the second direction;
- a retainer that is mounted on the bracket from a direction intersecting the second direction and faces the electric circuit unit in the second direction to restrict the electric circuit unit from moving in the second direction; and
- retainer locking portions that are formed on the bracket and the retainer and engage with each other by elastic deformation of one of the retainer locking portions to lock the retainer to the bracket, wherein
- the engagement protrusion is constituted by a first engagement protrusion and a second engagement protrusion that protrude toward the outer peripheral surface of the rim and face each other,
- the first engagement protrusion is provided with a bent engagement piece bent at a tip portion of the first engagement protrusion toward a side away from the second engagement protrusion,
- the second engagement protrusion is provided with a foot portion enlarged at a tip portion of the second engagement protrusion with respect to a base end portion in a third direction that is perpendicular to both the first direction in which the first engagement protrusion and the second engagement protrusion protrude and the second direction in which the first engagement protrusion and the second engagement protrusion face each other,
- the bracket is provided with a pair of pedestal protrusions that protrude toward a side away from the outer peripheral surface of the rim and have, at tip portions, upper surface walls that are perpendicular to a direction in which the pair of pedestal protrusions protrude,
- the engagement hole is constituted by a first engagement hole that passes through a side wall of one of the pair of pedestal protrusions facing another one of the pair of pedestal protrusions, and a second engagement hole that passes through the upper surface wall of the another one of the pair of pedestal protrusions,
- the second engagement hole is provided with a wide portion suitable for the foot portion to pass through, and a narrow portion that is suitable for the base end portion of the second engagement protrusion to pass through and located on a side closer to the first engagement hole relative to the wide portion, and
- the electric circuit unit is moved in the first direction, the second engagement protrusion is inserted into the wide portion of the second engagement hole and then moved in the second direction in such a way that the base end portion of the second engagement protrusion is engaged with the narrow portion of the second engagement hole and the bent engagement piece of the first engagement protrusion is engaged with the first engagement hole, and then the retainer is inserted into the wide portion of the second engagement hole.

10. The in-tire electric device according to claim 9, wherein
- the electric circuit unit includes a pressure sensor that detects a pressure in a tire and a wireless circuit that wirelessly transmits a detection result of the pressure sensor.

* * * * *